United States Patent
Yu et al.

(10) Patent No.: US 11,468,657 B2
(45) Date of Patent: Oct. 11, 2022

(54) STORAGE MEDIUM, INFORMATION PROCESSING APPARATUS, AND LINE-OF-SIGHT INFORMATION PROCESSING METHOD

(71) Applicant: FUJITSU LIMITED, Kawasaki (JP)

(72) Inventors: Shanshan Yu, Kawasaki (JP); Kiyonori Morioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 17/015,777

(22) Filed: Sep. 9, 2020

(65) Prior Publication Data

US 2021/0081697 A1     Mar. 18, 2021

(30) Foreign Application Priority Data

Sep. 12, 2019  (JP) .............................. JP2019-166031

(51) Int. Cl.
| G06V 10/25 | (2022.01) |
| H04N 7/14 | (2006.01) |
| G06V 40/16 | (2022.01) |
| G06V 40/18 | (2022.01) |

(52) U.S. Cl.
CPC ............ *G06V 10/25* (2022.01); *G06V 40/161* (2022.01); *G06V 40/193* (2022.01); *H04N 7/147* (2013.01)

(58) Field of Classification Search
CPC .... G06V 40/193; G06V 40/161; G06V 10/25; H04N 7/147
USPC .............................. 382/282; 348/14.01–14.16
See application file for complete search history.

(56) References Cited

U.S. PATENT DOCUMENTS

| 2005/0081147 A1 | 4/2005 | Tanaka et al. |
| 2015/0237079 A1* | 8/2015 | Hirata ..................... H04L 65/60 348/14.07 |
| 2017/0310928 A1 | 10/2017 | Nakano et al. |
| 2021/0405865 A1* | 12/2021 | Faulkner ................ H04N 7/147 |

FOREIGN PATENT DOCUMENTS

| JP | 2005-100338 A | 4/2005 |
| JP | 2015-219892 A | 12/2015 |
| JP | 2016-063413 A | 4/2016 |
| JP | 2016163166 A * | 9/2016 ........... A61B 3/0025 |

OTHER PUBLICATIONS

Feng Lu et al., "Appearance-Based Gaze Estimation via Uncalibrated Gaze Pattern Recovery", IEEE Transactions on Image Processing, vol. 26, No. 4, Apr. 2017 (Total 11 pages).

* cited by examiner

*Primary Examiner* — Melur Ramakrishnaiah
(74) *Attorney, Agent, or Firm* — Fujitsu Patent Center

(57) ABSTRACT

A non-transitory computer-readable storage medium storing a program that causes a computer to execute a process, the process includes calculating second information indicating a line of sight of the second user in the call performing period based on second user images displayed on the first display; estimating a display region of the first user images in a screen of a second display in the second display that displays the content and the first user images, based on a difference between the line of sight of the second user in the first period and the line of sight of the second user in the second period indicated in the second information; and estimating whether the second user looks at the first user images displayed on the second display in the call performing period based on the estimated display region of the first user images and the second information.

11 Claims, 16 Drawing Sheets

| TIME | LINE-OF-SIGHT ESTIMATION RESULT | INTEREST LEVEL [%] |
|---|---|---|
| 0:00:00 | 1 | |
| ⋮ | ⋮ | ⋮ |
| 0:00:50 | 0 | 25 |
| ⋮ | ⋮ | ⋮ |
| 0:01:40 | 0 | 35 |
| ⋮ | ⋮ | ⋮ |
| 0:02:30 | 1 | 60 |
| ⋮ | ⋮ | ⋮ |
| 0:03:20 | 0 | 60 |
| ⋮ | ⋮ | ⋮ |
| 0:04:10 | 1 | 75 |
| ⋮ | ⋮ | ⋮ |
| 0:05:00 | 1 | 80 |
| ⋮ | ⋮ | ⋮ |
| 0:05:50 | 1 | 80 |
| ⋮ | ⋮ | ⋮ |

FIG. 15
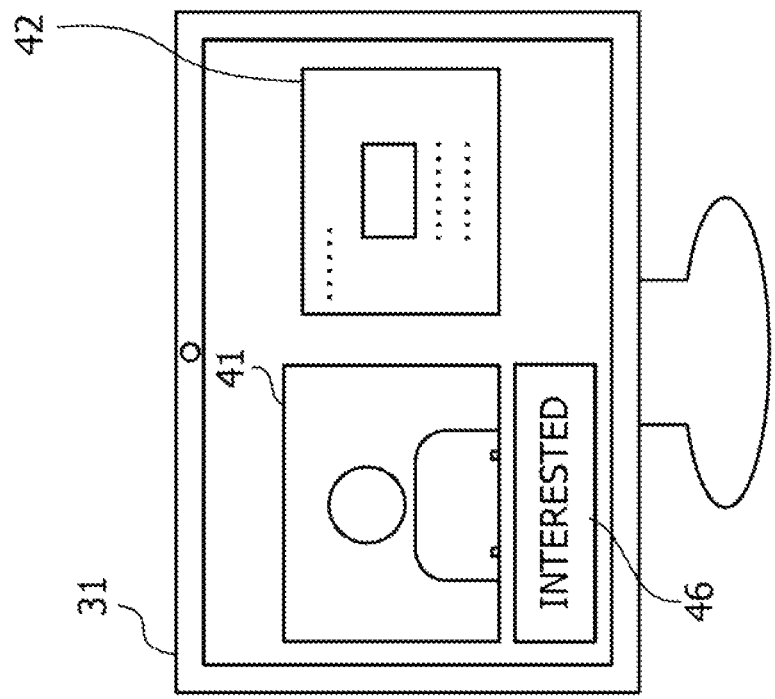
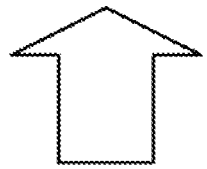
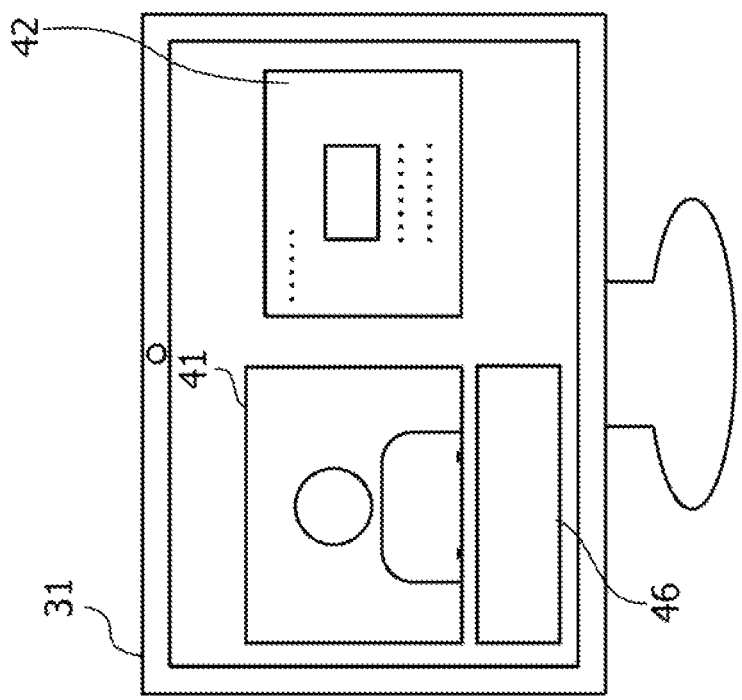

STORAGE MEDIUM, INFORMATION PROCESSING APPARATUS, AND LINE-OF-SIGHT INFORMATION PROCESSING METHOD

CROSS-REFERENCE TO RELATED APPLICATION

This application is based upon and claims the benefit of priority of the prior Japanese Patent Application No. 2019-166031, filed on Sep. 12, 2019, the entire contents of which are incorporated herein by reference.

FIELD

The embodiments discussed herein are related to a storage medium, an information processing apparatus, and a line-of-sight information processing method.

BACKGROUND

In a case where a counselor estimates a psychological state of a client in counseling, not only verbal information but also nonverbal information obtained from the client are important. For example, the counselor can read information such as the client is interested in a topic or the client wants to speak from line-of-sight information of the client.

Furthermore, in recent years, remote counseling has been increased that uses the video call technology to perform communication between the counselor and the client via a display or the like by remote communication. In order to obtain the line-of-sight information in the remote counseling, a technology for detecting a line of sight of the client who looks at the display is important for the counselor. At this time, a position on the display where an image of the client is displayed differs depending on layout.

As a technology regarding the layout of the display, for example, an element layout device has been proposed that calculates a difference time between layout elements on the basis of time information and arranges the layout elements along a path of path information at arrangement intervals between corresponding layout elements in the difference time. Furthermore, as a technology regarding line-of-sight detection, for example, a line-of-sight analysis system has been proposed that can create a heat map suitable for confirming how a target can be seen in comparison with a visual field of a viewer. Furthermore, a method for matching a line-of-sight pattern with an arbitrary line-of-sight target with a simple configuration has been proposed.

Furthermore, as a technology regarding communication by the remote communication, for example, a dialogue communication system that detects an orientation of a face of a dialogist and determines whether or not to continue dialogue communication depending on a distance and the orientation of the face that have been detected. For example, Japanese Laid-open Patent Publication No. 2005-100338, Japanese Laid-open Patent Publication No. 2015-219892, Japanese Laid-open Patent Publication No. 2016-63413, Feng Lu, Xiaowu Chen, Yoichi Sato, "Appearance-Based Gaze Estimation via Uncalibrated Gaze Pattern Recovery" *IEEE Transactions on Image Processing*, Vol. 26, No. 4, April 2017, and the like are disclosed as related art.

SUMMARY

According to an aspect of the embodiments, a non-transitory computer-readable storage medium storing a program that causes a computer to execute a process, the process includes determining a first period in which a first user has described content and a second period in which the first user and a second user perform communication except for the description of the content based on layout information indicating display regions, in a screen of a first display, of a plurality of second user images, in which a face of the second user is imaged, displayed on the first display of a first terminal device in a call performing period of a video call between the first user who uses the first terminal device and the second user who uses a second terminal device connected to the first terminal device via a network and the content displayed on the first display and first line-of-sight information indicating a line of sight of the first user to the first display in the call performing period calculated from a plurality of first user images in which a face of the first user is imaged; calculating second line-of-sight information indicating a line of sight of the second user in the call performing period based on the plurality of second user images displayed on the first display; estimating a display region of the plurality of first user images in a screen of a second display in the second display of the second terminal device that displays the content and the plurality of first user images, based on a difference between the line of sight of the second user in the first period and the line of sight of the second user in the second period indicated in the second line-of-sight information; and estimating whether the second user looks at the plurality of first user images displayed on the second display of the second terminal device in the call performing period based on the estimated display region of the plurality of first user images and the second line-of-sight information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a line-of-sight estimation result table;

FIG. 15 is a diagram illustrating a display example of a line-of-sight estimation result.

DESCRIPTION OF EMBODIMENTS

In a case where a client frequently looks at a counselor in counseling, there are many cases where the client is interested in a topic or wants to speak. In order to determine whether or not the client looks at the counselor in remote counseling, it is sufficient to determine whether or not the client looks at an image of the counselor displayed on a display of the client.

However, it may be restricted to install software used to transmit layout information of the display of the client to an information processing apparatus of the counselor side in an information processing apparatus of the client side. In this case, a display position of the image of the counselor on the display of the client is unknown. Therefore, it is difficult to determine whether or not the client looks at the image of the counselor.

In view of above, it is desirable to provide a determination technology with high versatility regarding whether or not one user of a video call looks at an image of another user.

Hereinafter, the present embodiment will be described with reference to the drawings. Note that, each of the embodiments may be implemented in combination within a scope without contradiction.

First Embodiment

First, a first embodiment will be described.

Figure 1:
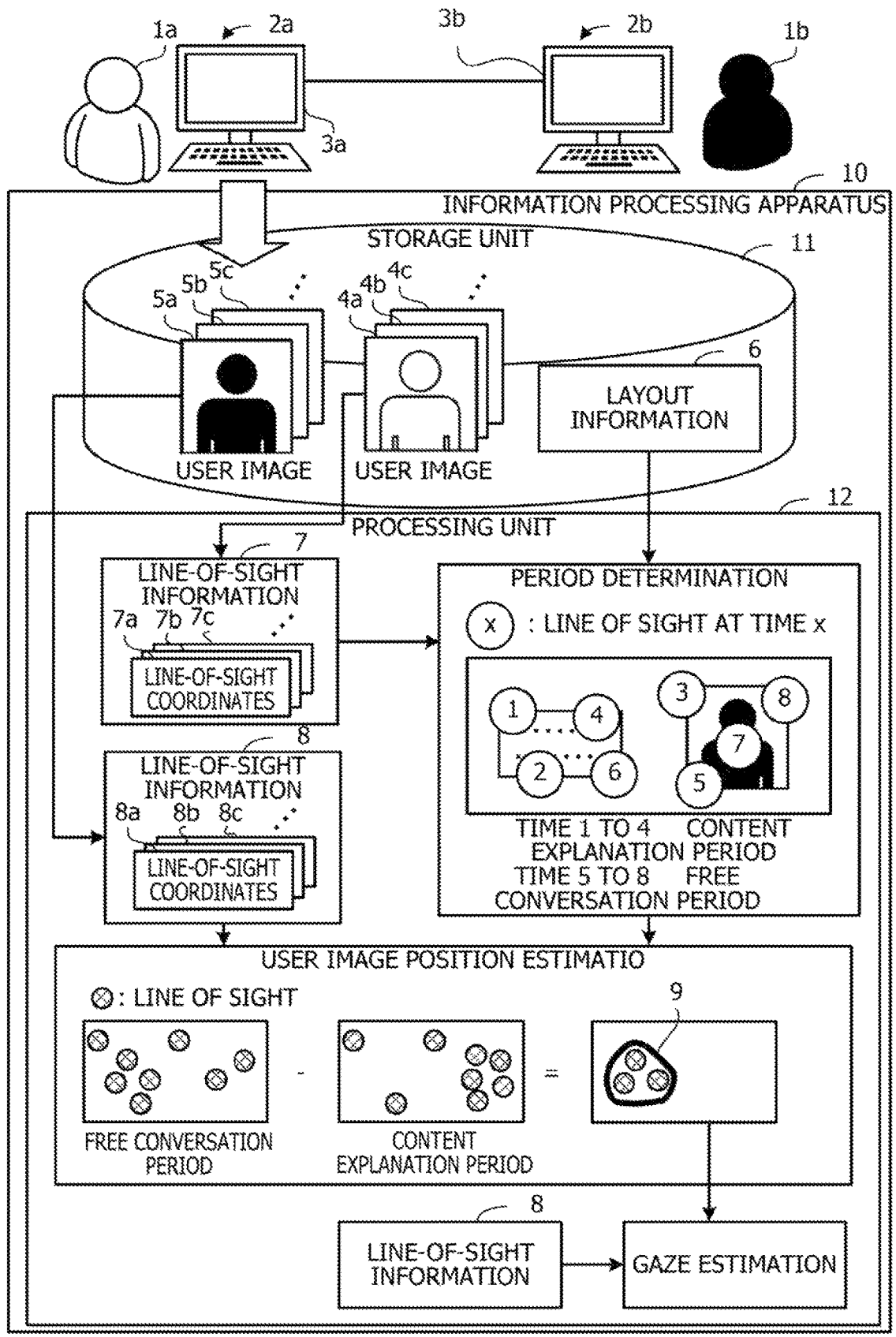
FIG. 1 is a diagram illustrating an example of an information processing system that performs a line-of-sight information processing method.

FIG. 1 is a diagram illustrating an example of an information processing system that performs a line-of-sight information processing method. In the example in FIG. 1, an information processing apparatus 10 performs a line-of-sight information processing method. The information processing apparatus 10 can perform the line-of-sight information processing method, for example, by executing a line-of-sight information processing program in which a processing procedure of the line-of-sight information processing method is written.

The information processing apparatus 10 estimates whether or not a user 1b looks at an image of a user 1a in a call performing period of a video call between the user 1a who uses a terminal device 2a and the user 1b who uses a terminal device 2b connected via a network. The terminal device 2a includes a display unit 3a. The display unit 3a is, for example, a monitor connected to the terminal device 2a. The terminal device 2b includes a display unit 3b. The display unit 3b is, for example, a monitor connected to the terminal device 2b. The information processing apparatus 10 may be connected to the terminal device 2a, or the terminal device 2a may have a function of the information processing apparatus 10.

The information processing apparatus 10 includes a storage unit 11 and a processing unit 12. The storage unit 11 is, for example, a memory included in the information processing apparatus 10 or a storage device. The processing unit 12 is, for example, a processor included in the information processing apparatus 10 or an arithmetic circuit.

The storage unit 11 stores user images 4a, 4b, 4c . . . , user images 5a, 5b, 5c . . . , and layout information 6. Each of the user images 4a, 4b, 4c . . . is an image in which a face of the user 1a is imaged displayed on the display unit 3b of the terminal device 2b in the call performing period. The terminal device 2b displays the user images 4a, 4b, 4c . . . in a common display region in a screen in real time during the video call.

Each of the user images 5a, 5b, 5c . . . is an image in which a face of the user 1b is imaged displayed on the display unit 3a of the terminal device 2a in the call performing period. The terminal device 2a displays the user images 5a, 5b, 5c . . . . In the common display region in the screen in real time during the video call. The layout information 6 indicates a display layout of the display unit 3a. For example, the layout information 6 indicates a display region, within a screen of the display unit 3a, of the user images 5a, 5b, 5c . . . displayed on the display unit 3a and content displayed on the display unit 3a.

The processing unit 12 calculates line-of-sight information 7 indicating a line of sight of the user 1a directed to the display unit 3a in the call performing period from the user images 4a, 4b, 4c . . . . The line-of-sight information 7 includes, for example, line-of-sight coordinates 7a, 7b, 7c . . . each indicating a position to which the line of sight of the user 1a is directed in the call performing period. The line-of-sight coordinates 7a, 7b, 7c . . . are coordinates of the position, on the screen of the display unit 3a, to which the line of sight of the user 1a is directed in the call performing period. The processing unit 12 calculates the line-of-sight coordinates 7a, 7b, 7c . . . , for example, by a method described in Non-Patent Document 1 described above.

On the basis of the layout information 6 and the line-of-sight information 7, the processing unit 12 determines a content explanation period in which the user 1a explains the content and a free conversation period in which communication other than the explanation on the content is performed between the user 1a and the user 1b. For example, in a case where a ratio of the line of sight directed to the content display region, among the line of sight of the user 1a in a determination target unit period of a plurality of unit periods obtained by dividing the call performing period, is equal to or more than a predetermined value, the processing unit 12 determines that the determination target unit period is the content explanation period.

As an example, at the time "1", "2", "4", and "6" of a video call having a call performing period including time "1" to "8", it is assumed that the position to which the line of sight of the user 1a is directed be included in the content display region. Furthermore, at the time "3", "5", "7", and "8", it is assumed that the position to which the line of sight of the user 1a is directed be included in the display regions of the user images 5a, 5b, 5c . . . . Here, the processing unit 12 sets a unit period in which a ratio of the positions included in the display region of the content with respect to the plurality of positions to which the line of sight of the user 1a is directed in each unit period obtained by dividing the call performing period into unit periods each including four times is equal to or more than 50% as the content explanation period. In this case, the processing unit 12 determines the time "1" to "4" as the content explanation period and determines the time "5" to "8" as the free conversation period.

The processing unit 12 calculates line-of-sight information 8 indicating a line of sight of the user 1b in the call performing period on the basis of the user images 5a, 5b, 5c . . . . The line-of-sight information 8 includes, for example, line-of-sight coordinates 8a, 8b, 8c . . . each indicating a position to which the line of sight of the user 1b is directed in the call performing period. The line-of-sight coordinates 8a, 8b, 8c . . . are, for example, coordinates, on a plane including the screen of the display unit 3b, at the position to which the line of sight of the user 1b is directed in the call performing period. The line-of-sight coordinates 8a, 8b, 8c . . . are calculated by a method same as the method for calculating the line-of-sight coordinates 7a, 7b, 7c . . . .

The processing unit 12 estimates an estimated display region 9 on the basis of a difference between the line of sight of the user 1b in the content explanation period and that in the free conversation period indicated in the line-of-sight information 8. The estimated display region 9 estimates display regions, in the screen of the display unit 3b, of the user images 4a, 4b, 4c . . . on the display unit 3b that displays the content and the user images 4a, 4b, 4c . . . .

For example, for each unit region obtained by dividing the screen of the display unit 3b, the processing unit 12 counts a first number of times indicating the number of times when the line of sight of the user 1b is directed to the unit region in the content explanation period. Furthermore, for each unit region, the processing unit 12 counts a second number of times indicating the number of times when the line of sight of the user 1b is directed to the unit region in the free conversation period. Then, the processing unit 12 estimates a set of unit regions of which a value obtained by subtracting the first number of times per unit time from the second number of times per unit time is equal to or more than a predetermined value, as the estimated display region 9. For example, the processing unit 12 estimates a region that is more often watched by the user 1b in the free conversation period than that in the content explanation period as the estimated display region 9.

The processing unit 12 estimates whether or not the user 1b looks at the user images 4a, 4b, 4c . . . displayed on the display unit 3b of the terminal device 2b in the call performing period on the basis of the estimated display region 9 and the line-of-sight information 8. For example, in a case where the coordinates of the position to which the line of sight of the user 1b is directed at a predetermined time in the call performing period are included in the estimated display region 9, the processing unit 12 estimates that the user 1b looks at the user images 4a, 4b, 4c . . . at the predetermined time. On the other hand, in a case where the coordinates of the position to which the line of sight of the user 1b is directed at the predetermined time is not included in the estimated display region 9, the processing unit 12 estimates that the user 1b does not look at the user images 4a, 4b, 4c . . . at the predetermined time. The processing unit 12 may display information indicating the estimation result on the display unit 3a of the terminal device 2a.

In this way, on the basis of the line of sight of the user 1a and the layout information 6, the call performing period is divided into the content explanation period and the free conversation period, and the estimated display region 9 is estimated on the basis of the line of sight of the user 1b in each period. Then, according to whether or not the line of sight of the user 1b is directed to the estimated display region 9 at a certain time, it is estimated whether or not the user 1b looks at the image of the user 1a at that time. As a result, even in a case where the layout of the terminal device 2b used by the user 1b is unknown, it is possible to estimate whether or not the user 1b looks at the image of the user 1a displayed on the display unit 3b. For example, a range of systems, to which the technology for determining whether or not one user in the video call looks at an image of another user can be applied, is expanded, and versatility of such a determination technology is enhanced.

For example, the information processing apparatus 10 may be used for remote counseling performed by the user 1a who is a counselor to the user 1b who is a client. In this case, for example, in a period from start of the counseling to a fixed time, the estimated display region 9 is estimated. Then, by executing line-of-sight information processing after the period has elapsed, the user 1a can recognize whether or not the user 1b looks at the image of the user 1a displayed on the display unit 3b in real time. With this operation, the user 1a can acquire information obtained from the line of sight of the user 1b such as whether or not the user 1b is interested in the user 1a, whether or not the user 1b wants to talk to the user 1a, or the like.

Furthermore, the processing unit 12 may execute the following processing in order to exclude the line of sight of the user 1b in a case where the user 1b changes an orientation of the face and looks away from the line of sight used to estimate the estimated display region 9. The processing unit 12 calculates a value indicating the orientation of the face of the user 1b in the call performing period from the user images 5a, 5b, 5c . . . . The value indicating the orientation of the face is, for example, a ratio of the size of the left eye to the size of the right eye of the user 1b imaged in the user images 5a, 5b, 5c . . . . The processing unit 12 calculates an average value of the values indicating the orientation of the face in the content explanation period. Then, in a case where an absolute value of a difference between the value indicating the orientation of the face calculated from a predetermined user image in which the face of the user 1b is imaged in the free conversation period and the average value of the values indicating the orientation of the face is equal to or more than a threshold, the processing unit 12 excludes the line of sight of the user 1b calculated from the predetermined user image from a count target. With this operation, accuracy for estimating the estimated display region 9 is improved.

Second Embodiment

Next, a second embodiment will be described. In the second embodiment, in remote counseling using a video call, it is estimated whether or not a client who receives counseling watches a moving image of a counselor in real time. Note that, in the following description, there is a case where a position to which a line of sight is directed is simply referred to as a line of sight.

Figure 2:
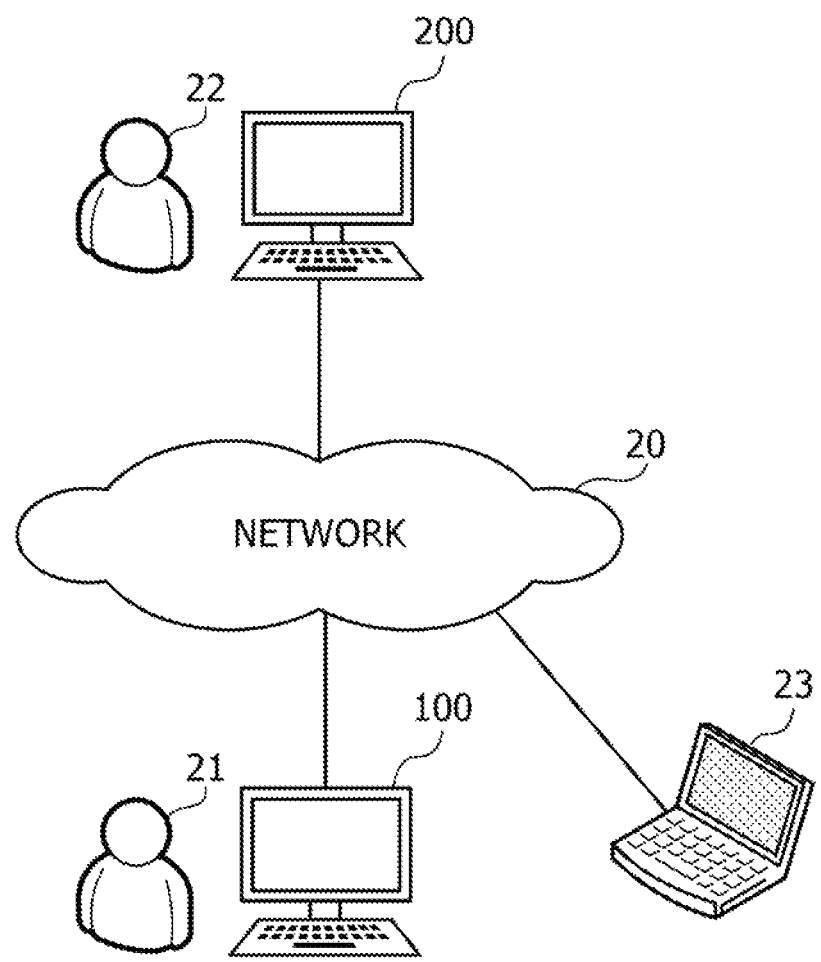
FIG. 2 is a diagram illustrating an example of a system configuration according to a second embodiment.

FIG. 2 is a diagram illustrating an example of a system configuration according to the second embodiment. A counselor terminal 100 is connected to a client terminal 200 and an instructor terminal 23 via a network 20. The counselor terminal 100 is a computer used by a counselor 21. The client terminal 200 is a computer used by a client 22. The instructor terminal 23 is a computer used by an instructor who gives a counseling instruction to the counselor 21.

The counselor 21 performs remote counseling to the client 22 by using the counselor terminal 100. The counselor terminal 100 transmits a moving image of the counselor 21 to the client terminal 200 in real time. Furthermore, the counselor terminal 100 displays the moving image received from the client terminal 200 in real time. Furthermore, the counselor terminal 100 estimates whether or not the client 22 watches the moving image of the counselor 21 in real time and displays the estimation result.

The client 22 receives the remote counseling from the counselor 21 by using the client terminal 200. The client terminal 200 transmits a moving image of the client 22 to the counselor terminal 100 in real time. Furthermore, the client terminal 200 displays the moving image received from the counselor terminal 100 in real time. The instructor terminal 23 is a terminal that is operated by the instructor of the counselor 21. The instructor terminal 23 acquires the counseling result by the counselor 21 to the client 22 from the counselor terminal 100.

Figure 3:
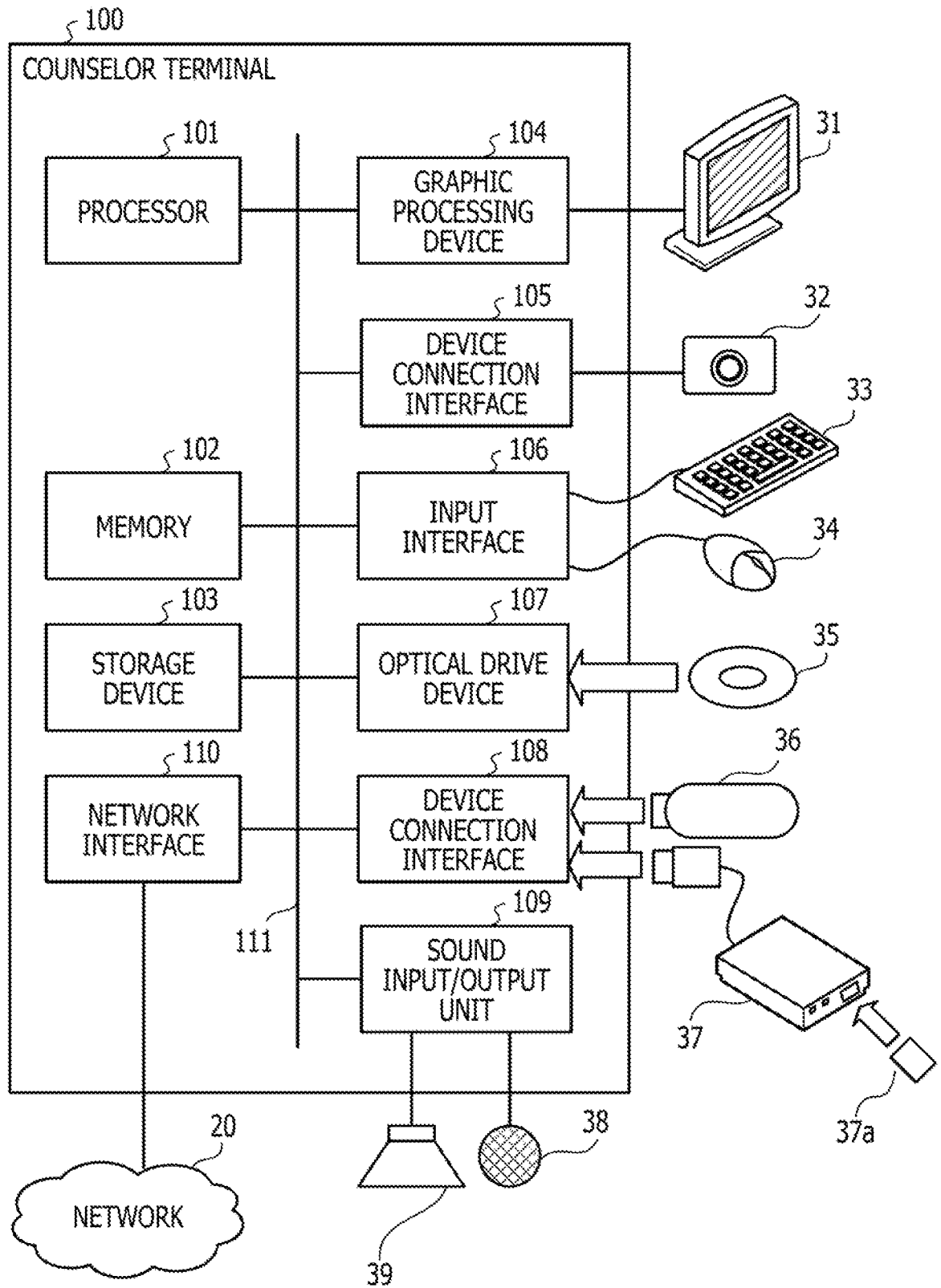
FIG. 3 is a diagram illustrating an example of hardware of a counselor terminal.

FIG. 3 is a diagram illustrating an example of hardware of the counselor terminal. The entire counselor terminal 100 is controlled by a processor 101. A memory 102 and a plurality of peripheral devices are connected to the processor 101 via a bus 111. The processor 101 may also be a multiprocessor. The processor 101 is, for example, a central processing unit (CPU), a micro processing unit (MPU), or a digital signal processor (DSP). At least a part of functions realized by execution of a program by the processor 101 may be realized by an electronic circuit such as an application specific integrated circuit (ASIC) and a programmable logic device (PLD).

The memory 102 is used as a main storage device of the counselor terminal 100. In the memory 102, at least a part of an operating system (OS) program and an application program to be executed by the processor 101 is temporarily stored. Furthermore, the memory 102 stores various data used in processing by the processor 101. As the memory 102, for example, a volatile semiconductor storage device such as a random access memory (RAM) is used.

The peripheral devices connected to the bus 111 include a storage device 103, a graphic processing device 104, a device connection interface 105, an input interface 106, an optical drive device 107, a device connection interface 108, a sound input/output unit 109, and a network interface 110.

The storage device 103 electrically or magnetically writes/reads data in/from a built-in recording medium. The storage device 103 is used as an auxiliary storage device of a computer. The storage device 103 stores the OS program, the application program, and various data. Note that, as the storage device 103, for example, a hard disk drive (HDD) or a solid state drive (SSD) can be used.

The graphic processing device 104 is connected to a monitor 31. The graphic processing device 104 displays an image on a screen of the monitor 31 according to a command from the processor 101. Examples of the monitor 31 include a display device using an organic electro luminescence (EL), a liquid crystal display device, or the like.

A camera 32 is connected to the device connection interface 105. The camera 32 is, for example, an imaging device that is provided on the upper portion of the monitor 31. According to the command from the processor 101, the camera 32 generates data of a still image or a moving image of scene where a lens of the camera 32 is directed and stores the data in the memory 102.

The input interface 106 is connected to a keyboard 33 and a mouse 34. The input interface 106 transmits signals transmitted from the keyboard 33 and the mouse 34 to the processor 101. Note that, the mouse 34 is an example of a pointing device, and other pointing devices can also be used. The other pointing devices include a touch panel, a tablet, a touch pad, a track ball, and the like.

The optical drive device 107 reads data recorded on an optical disc 35 by using laser light or the like. The optical disc 35 is a portable recording medium on which the data is recorded so as to be readable by reflection of light. Examples of the optical disc 35 include a digital versatile disc (DVD), a DVD-RAM, a compact disc read only memory (CD-ROM), a CD-recordable (R)/rewritable (RW), or the like.

The device connection interface 108 is a communication interface used to connect the peripheral device to the counselor terminal 100. For example, the device connection interface 108 can be connected to a memory device 36 and a memory reader/writer 37. The memory device 36 is a recording medium equipped with a communication function with the device connection interface 108. The memory reader/writer 37 is a device which writes data in a memory card 37a or reads data from the memory card 37a. The memory card 37a is a card-type recording medium.

The sound input/output unit 109 is connected to a microphone 38 and a speaker 39. The sound input/output unit 109 converts a sound signal input from the microphone 38 into a digital signal and transmits the converted signal to the processor 101. Furthermore, when receiving the sound data from the processor 101, the sound input/output unit 109 generates a sound signal according to the sound data and outputs sounds from the speaker 39.

The network interface 110 is connected to the network 20. The network interface 110 exchanges data with another computer or communication device via the network 20.

The counselor terminal 100 can realize a processing function according to the second embodiment with a hardware configuration as described above. Furthermore, the client terminal 200 and the instructor terminal 23 can be realized by hardware similar to that of the counselor terminal 100 illustrated in FIG. 3. However, it is not needed for the instructor terminal 23 to include the device connection interface 105, and it is not needed for the sound input/output unit 109 to be connected to the microphone 38. The information processing apparatus 10 indicated in the first embodiment can be realized by hardware similar to that of the counselor terminal 100 illustrated in FIG. 3. Furthermore, the processor 101 is an example of the processing unit 12 indicated in the first embodiment. Furthermore, the memory 102 or the storage device 103 is an example of the storage unit 11 indicated in the first embodiment. Furthermore, the monitor 31 is an example of the display unit 3a indicated in the first embodiment.

The counselor terminal 100 realizes the processing function of the second embodiment by executing, for example, a program recorded on a computer-readable recording medium. A program in which processing content to be executed by the counselor terminal 100 is described can be recorded on various recording media. For example, the program to be executed by the counselor terminal 100 can be stored in the storage device 103. The processor 101 loads at least a part of the program in the storage device 103 on the memory 102 and executes the program. Furthermore, it is also possible to record the program to be executed by the counselor terminal 100 on the portable recording medium such as the optical disc 35, the memory device 36, or the memory card 37a. The program stored in the portable recording medium can be executed after being installed on the storage device 103, for example, by control of the processor 101. Furthermore, the processor 101 can also read the program directly from the portable recording medium and execute the program.

Next, the remote counseling according to the second embodiment will be described.

In the remote counseling according to the second embodiment, the counselor terminal 100 and the client terminal 200 execute a video call application. The video call application displays a moving image of a party on a monitor in real time. For example, the counselor 21 and the client 22 communicate with each other by using a video call via the counselor terminal 100 and the client terminal 200. At this time, the counselor 21 may make an explanation to the client 22 by using a material displayed on the monitor, depending on a topic. Hereinafter, the display on the monitor and the tendencies of the line of sight of the counselor 21 and the line of sight of the client 22 will be described with reference to FIGS. 4 and 5.

Figure 4:
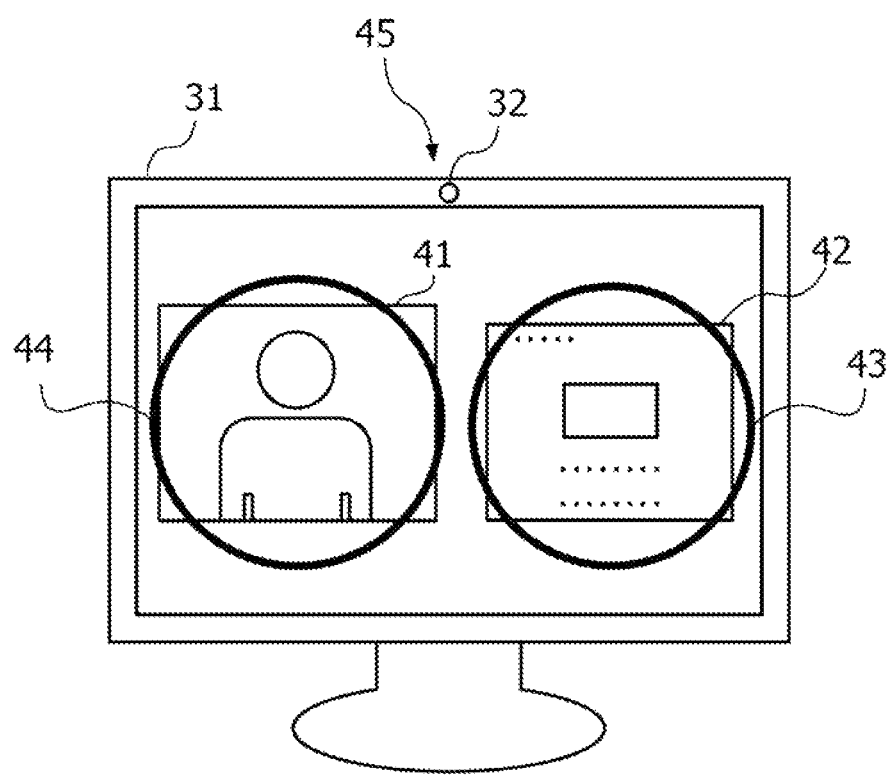
FIG. 4 is a diagram illustrating an example of a counselor-side monitor in remote counseling.

FIG. 4 is a diagram illustrating an example of a counselor-side monitor in the remote counseling. The counselor 21 performs counseling while watching the monitor 31 connected to the counselor terminal 100. The camera 32 is provided on the upper portion of the screen of the monitor 31. The counselor terminal 100 images the face of the counselor 21 with the camera 32. Note that the counselor terminal 100 acquires sounds including voice of the counselor 21 by using the microphone 38. The counselor terminal 100 transmits moving image data including image data indicating the image captured by the camera 32 and sound data indicating sound acquired by the microphone 38 to the client terminal 200 in real time.

On the screen of the monitor 31, a client moving image 41 and an explanatory material 42 are displayed. The client moving image 41 is an image reproduced by the counselor terminal 100 in real time on the basis of the moving image data received from the client terminal 200. In the reproduced moving image, the face of the client 22 is imaged. Note that the sound of the client moving image 41 is output, for example, by the speaker 39.

The explanatory material 42 is a material used for explanation by the counselor 21 to the client 22. For example, the counselor terminal 100 stores a file of the explanatory material 42, for example, in the storage device 103. Then, the counselor terminal 100 reads the file from the storage device 103 and displays the explanatory material 42 on the predetermined display region of the monitor 31.

Here, as a region to which the line of sight of the counselor 21 is directed during counseling at high frequency, a line-of-sight increasing region 43, a line-of-sight increasing region 44, a line-of-sight increasing position 45, or the like are included.

The line-of-sight increasing region 43 is a region to which the line of sight of the counselor 21 is directed at high frequency in a period (material explanation period) in which the counselor 21 explains the material. The line-of-sight increasing region 43 includes the region on the screen of the monitor 31 where the explanatory material 42 is displayed. This is because the counselor 21 talks to the client 22 while looking at the explanatory material 42 in the material explanation period.

The line-of-sight increasing region 44 is a region to which the line of sight of the counselor 21 is directed at high frequency in a period (free conversation period), in which communication is performed, other than the material explanation period. The line-of-sight increasing region 44 includes a region on the screen of the monitor 31 where the client moving image 41 is displayed. This is because the counselor 21 talks to the client 22 while watching the condition of the client 22 in the free conversation period.

The line-of-sight increasing position 45 is a position where the line of sight of the counselor 21 is directed at high frequency in the free conversation period. The line-of-sight increasing position 45 is a position where the camera 32 of the monitor 31 is provided. This is because, in the free conversation period, there is a case where the line of sight of the counselor 21 is directed to the camera 32 so as to make the client 22 feel that the counselor 21 is looking at the client 22.

Figure 5:
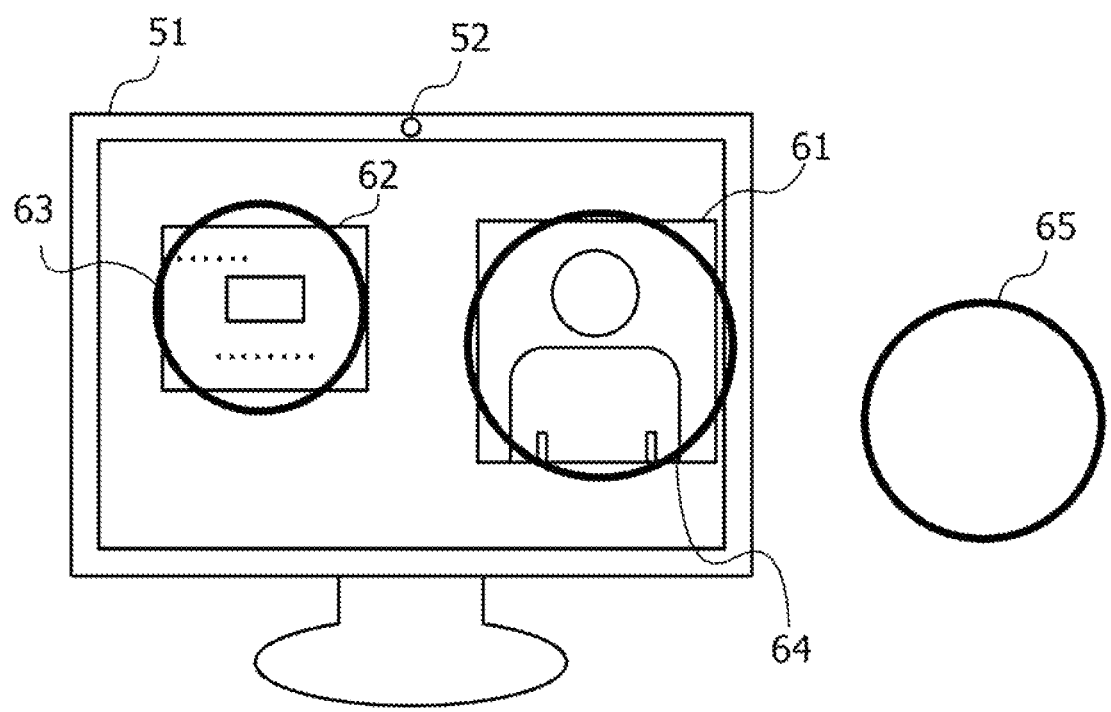
FIG. 5 is a diagram illustrating an example of a client-side monitor in the remote counseling.

FIG. 5 is a diagram illustrating an example of a client-side monitor in the remote counseling. The client 22 receives counseling while watching a monitor 51 connected to the client terminal 200. The monitor 51 is an example of the display unit 3b indicated in the first embodiment. A camera 52 connected to the client terminal 200 is provided on the upper portion of a screen of the monitor 51. The client terminal 200 images the face of the client 22 with the camera 52. Furthermore, the client terminal 200 acquires sound indicating voice of the client 22 by using a connected microphone. The client terminal 200 transmits moving image data including image data indicating an image captured by the camera 52 and sound data acquired by the microphone of the client terminal 200 to the counselor terminal 100 in real time.

On the screen of the monitor 51, a counselor moving image 61 and an explanatory material 62 are displayed. The counselor moving image 61 is an image reproduced by the client terminal 200 in real time on the basis of the moving image data received from the counselor terminal 100. In the reproduced moving image, the face of the counselor 21 is imaged. Note that the sound of the counselor moving image 61 is output, for example, by a speaker connected to the client terminal 200.

The explanatory material 62 is a material used for explanation by the counselor 21 to the client 22. For example, the client terminal 200 receives a file of the explanatory material 62 having same content as the explanatory material 42 displayed on the counselor terminal 100 from the counselor terminal 100 and stores the file in a storage device. Then, the client terminal 200 reads the file from the storage device and displays the explanatory material 62 on a predetermined display region of the monitor 51.

Here, as a region to which the line of sight of the client 22 is directed at high frequency during the counseling, a line-of-sight increasing region 63, a line-of-sight increasing region 64, a look-away region 65, or the like are included.

The line-of-sight increasing region 63 is a region to which the line of sight of the client 22 is directed at high frequency in the material explanation period. The line-of-sight increasing region 63 includes the region on the screen of the monitor 51 where the explanatory material 62 is displayed. This is because the client 22 talks to the counselor 21 while watching the explanatory material 62 in the material explanation period.

The line-of-sight increasing region 64 is a region to which the line of sight of the client 22 is directed at high frequency in the free conversation period. The line-of-sight increasing region 64 includes a region on the screen of the monitor 51 where the counselor moving image 61 is displayed. This is because the client 22 talks to the counselor 21 while looking at the counselor 21 in the free conversation period.

The look-away region 65 is a region outside the screen of the monitor 51. There is a case where the line of sight of the client 22 is directed to the region outside the screen of the monitor 51 such as the look-away region 65 when the client 22 is thinking or looking away.

Note that the explanatory materials 42 and 62 are examples of the content indicated in the first embodiment.

As described above, the tendencies of the line of sight of the counselor 21 and the line of sight of the client 22 in the material explanation period are different from those in the free conversation period. On the basis of the difference in the tendencies, the counselor terminal 100 estimates whether or not the client 22 watches the counselor moving image 61 without the layout information of the monitor 51. First, the counselor terminal 100 specifies the material explanation period and the free conversation period on the basis of the line of sight of the counselor 21 and the layout of the monitor 31. For example, the counselor terminal 100 determines a period in which the line of sight of the counselor 21 stays around the display region of the explanatory material 42 at a high ratio as the material explanation period. Furthermore, the counselor terminal 100 determines a period in which the line of sight of the counselor 21 stays around the display region of the client moving image 41 or is directed to the camera 32 at a high ratio as the free conversation period.

Next, the counselor terminal 100 estimates a region where the counselor moving image 61 is displayed on the monitor 51 on the basis of the difference in the line of sight of the client 22 in the material explanation period and that in the free conversation period that are estimated. Then, the counselor terminal 100 estimates whether or not the client 22 looks at the estimated region.

Furthermore, the counselor terminal 100 determines whether or not the client 22 looks at the look-away region 65 from the orientation of the face of the client 22. The counselor terminal 100 determines that the client 22 looks at the look-away region 65 at a time when the orientation of the face of the client 22 is largely deviated from an average. Then, the counselor terminal 100 excludes the line of sight of the client 22 at that time from the line of sight used to estimate the region where the counselor moving image 61 is displayed.

Next, a function of the counselor terminal 100 will be described in detail.

Figure 6:
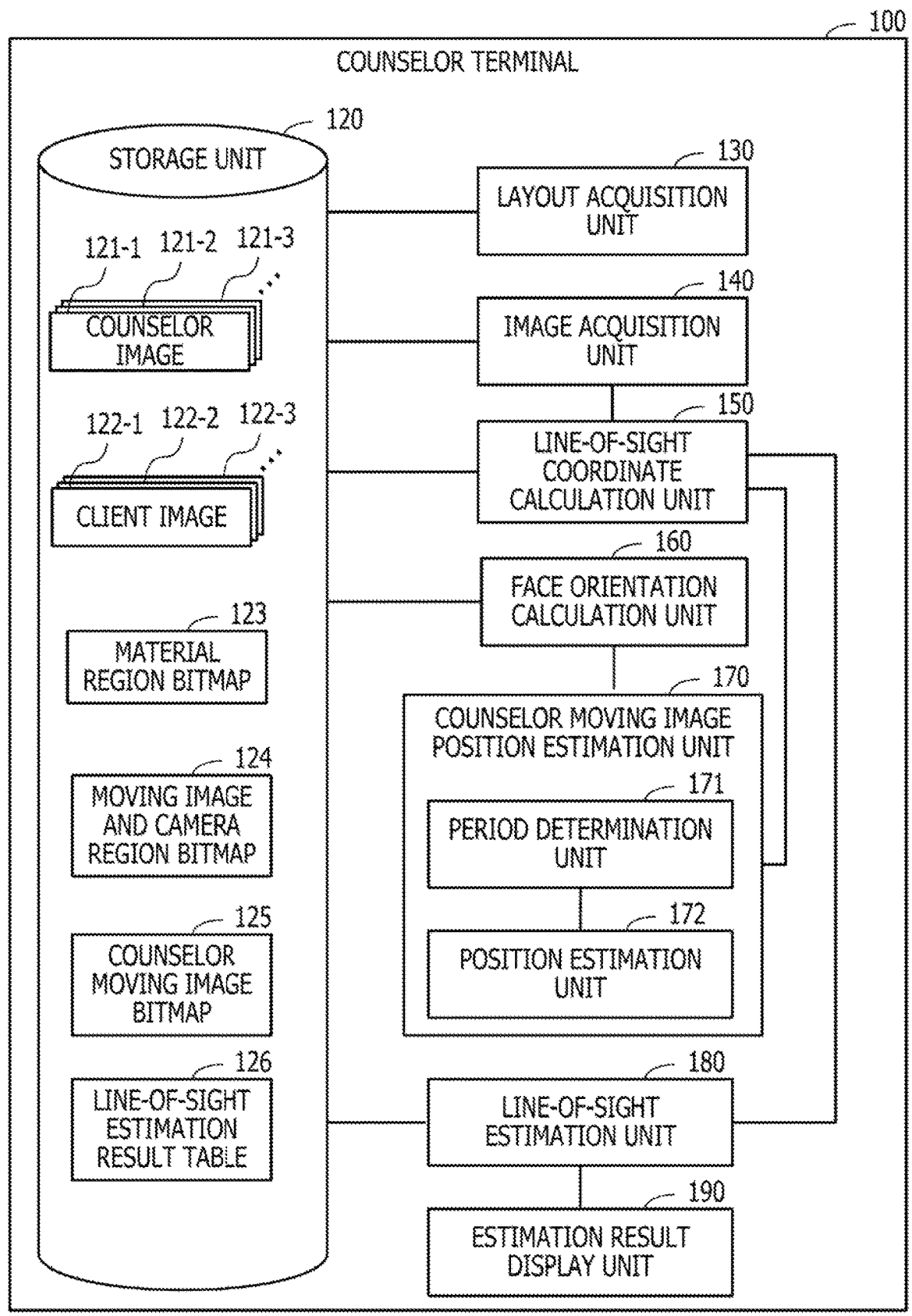
FIG. 6 is a block diagram illustrating a function of the counselor terminal.

FIG. 6 is a block diagram illustrating the function of the counselor terminal. The counselor terminal 100 includes a storage unit 120, a layout acquisition unit 130, an image acquisition unit 140, a line-of-sight coordinate calculation unit 150, a face orientation calculation unit 160, a counselor moving image position estimation unit 170, a line-of-sight estimation unit 180, and an estimation result display unit 190.

The storage unit 120 stores counselor images 121-1, 121-2, 121-3 . . . and client images 122-1, 122-2, 122-3 . . . . Furthermore, the storage unit 120 stores a material region bitmap 123, a moving image and camera region bitmap 124, a counselor moving image bitmap 125, and a line-of-sight estimation result table 126.

The counselor images 121-1, 121-2, 121-3 . . . are images in which the face of the counselor 21 is imaged. Each of the counselor images 121-1, 121-2, 121-3 . . . is associated with a time when the image is captured. The client images 122-1, 122-2, 122-3 . . . are images in which the face of the client 22 is imaged. Each of the client images 122-1, 122-2, 122-3 . . . is associated with a time when the image is captured.

The material region bitmap 123 is bitmap-format information indicating a region in the screen displayed on the monitor 31 where the explanatory material is displayed. The moving image and camera region bitmap 124 is bitmap-format information indicating a region in the screen displayed on the monitor 31 where the client moving image is displayed and a position where the camera 32 is provided. For example, the material region bitmap 123 and the moving image and camera region bitmap 124 are bitmaps each having bits respectively corresponding to the plurality of unit regions obtained by dividing a plane which includes the screen of the monitor 31 and the periphery (range including position where camera 32 is provided). In the material region bitmap 123, a bit corresponding to the line-of-sight increasing region 43 to which the line of sight is directed at high frequency in the material explanation period is set to "1", and other bits are set to "0". In the moving image and camera region bitmap 124, a bit corresponding to the line-of-sight increasing region 44 or the line-of-sight increasing position 45 to which the line of sight is directed at high frequency in the free conversation period is set to "1", and other bits are set to "0".

The counselor moving image bitmap 125 is a bitmap having bits respectively corresponding to the plurality of unit regions obtained by dividing the screen of the monitor 51. In the counselor moving image bitmap 125, a bit corresponding to a region that is estimated to display the counselor moving image 61 is set to "1", and other bits are set to "0". The line-of-sight estimation result table 126 is a table that stores a result of the estimation of the line of sight of the client 22 at each time.

The layout acquisition unit 130 acquires a screen layout displayed on the monitor 31 of the counselor terminal 100. The layout acquisition unit 130 may acquire the screen layout from the OS of the counselor terminal 100 or an input of the counselor 21. Furthermore, the layout acquisition unit 130 acquires a region on the screen of the monitor 31 where the camera 32 is provided. The region where the camera 32 is provided is specified, for example, according to the input of the counselor 21. The layout acquisition unit 130 generates the material region bitmap 123 and the moving image and camera region bitmap 124 on the basis of the acquired screen layout and the region where the camera 32 is provided and stores the generated bitmap in the storage unit 120.

The image acquisition unit 140 acquires the image of the counselor 21 imaged by the camera 32 in real time. Then, the image acquisition unit 140 associates the acquired image with the time when the image is captured and stores the acquired images as the counselor images 121-1, 121-2, 121-3 . . . in the storage unit 120. Furthermore, the image acquisition unit 140 acquires the image in which the face of the client 22 is imaged from the moving image received from the client terminal 200 in real time. Then, the image acquisition unit 140 associates the acquired image with the time when the image is captured and stores the acquired images as the client images 122-1, 122-2, 122-3 . . . in the storage unit 120.

The line-of-sight coordinate calculation unit 150 calculates the line-of-sight coordinates of the counselor 21 from the counselor images 121-1, 121-2, 121-3 . . . . The line-of-sight coordinates of the counselor 21 indicate the coordinates on the monitor 31, to which the line of sight of the counselor 21 is directed, for example, calculated by a method indicated in Non-Patent Document 1. Furthermore, the line-of-sight coordinate calculation unit 150 calculates the line-of-sight coordinates of the client 22 from the client images 122-1, 122-2, 122-3 . . . . The line-of-sight coordinates of the client 22 indicate the coordinates on the plane including the screen of the monitor 51 to which the line of sight of the client 22 is directed. The line-of-sight coordinates of the client 22 are calculated by a method similar to that of the line-of-sight coordinates of the counselor 21.

The face orientation calculation unit 160 calculates a value indicating the orientation of the face of the client 22 at each time from the client images 122-1, 122-2, 122-3 . . . . The value indicating the orientation of the face is, for example, a ratio of the size of the left eye to the size of the right eye of the client 22 imaged in the client images 122-1, 122-2, 122-3 . . . .

The counselor moving image position estimation unit 170 specifies the material explanation period and the free conversation period on the basis of the counselor images 121-1, 121-2, 121-3 . . . and estimates a display position of the counselor moving image 61 on the basis of the client images 122-1, 122-2, 122-3 . . . . The counselor moving image position estimation unit 170 includes a period determination unit 171 and a position estimation unit 172.

The period determination unit 171 divides the period in which the counselor images 121-1, 121-2, 121-3 . . . are imaged into a plurality of unit periods and determines which one of the material explanation period or the free conversation period include each unit period. For example, the period determination unit 171 makes the line-of-sight coordinate calculation unit 150 calculate the line-of-sight coordinates of the counselor 21 at each time from the counselor images 121-1, 121-2, 121-3 . . . . Then, in a case where the number of line-of-sight coordinates in the region in the material region bitmap 123 in which the bit is set to "1" is equal to or more than the number of line-of-sight coordinates in the region in the moving image and camera region bitmap 124 in which the bit is set to "1" in a certain unit period, the period determination unit 171 determines that the unit period is the material explanation period. On the other hand, in a case where the number of line-of-sight coordinates in the region in the material region bitmap 123 in which the bit is set to "1" is less than the number of line-of-sight coordinates in the region in the moving image and camera region bitmap 124 in which the bit is set to "1" in the certain unit period, the period determination unit 171 determines that the unit period is the free conversation period.

The position estimation unit 172 generates the counselor moving image bitmap 125. For example, the position estimation unit 172 makes the line-of-sight coordinate calculation unit 150 calculate the line-of-sight coordinates of the client 22 at each time included in the material explanation period from the client image, which is imaged in the material explanation period, among the client images 122-1, 122-2, 122-3 . . . . Furthermore, the position estimation unit 172 makes the line-of-sight coordinate calculation unit 150 calculate the line-of-sight coordinates of the client 22 at each time included in the free conversation period from the client image, which is imaged in the free conversation period, among the client images 122-1, 122-2, 122-3 . . . .

The position estimation unit 172 counts each of the line-of-sight coordinates of the client 22 in the material explanation period and the line-of-sight coordinates of the client 22 in the free conversation period included in each of the plurality of unit regions obtained by dividing the region of the monitor 51. For each unit region, the position estimation unit 172 calculates a difference between the number of line-of-sight coordinates of the client 22 in the free conversation period and the number of line-of-sight coordinates of the client 22 in the material explanation period. Then, the position estimation unit 172 generates the counselor moving image bitmap 125 in which a bit corresponding to the unit region where the difference is equal to or more than the threshold is set to "1" and other bits are set to "0", and stores the counselor moving image bitmap 125 in the storage unit 120.

Note that the position estimation unit 172 excludes the line of sight at the time when the orientation of the face of the client 22 is largely deviated from the average in the free conversation period from the count target. The position estimation unit 172 makes the face orientation calculation unit 160 calculate the value indicating the orientation of the face of the client 22 at each time included in the material explanation period from the client image, which is imaged in the material explanation period, among the client images 122-1, 122-2, 122-3 . . . . Then, the position estimation unit 172 calculates an average value of the values indicating the orientation of the face of the client 22 in the material explanation period.

The position estimation unit 172 makes the face orientation calculation unit 160 calculate the value indicating the orientation of the face of the client 22 at each time included in the free conversation period from the client image, which is imaged in the free conversation period, among the client images 122-1, 122-2, 122-3 . . . . Then, in a case where an absolute value of a difference between the value indicating the orientation of the face at a certain time included in the free conversation period and an average value of the value indicating the orientation of the face in the material explanation period is equal to or more than a threshold, the position estimation unit 172 excludes the line-of-sight coordinates of the client 22 at that time from the count target.

The line-of-sight estimation unit 180 estimates (line-of-sight estimation) whether or not the client 22 is currently watching the counselor moving image 61 on the basis of the client moving image 41 acquired in real time. The line-of-sight estimation unit 180 makes the line-of-sight coordinate calculation unit 150 calculate the current line-of-sight coordinates of the client 22 from the image of the client 22 acquired by the image acquisition unit 140. Then, in a case where the current line-of-sight coordinates of the client 22 are included in the region of the counselor moving image bitmap 125 in which the bit is set to "1", the line-of-sight estimation unit 180 determines that the client 22 is currently watching the counselor moving image 61. On the other hand, in a case where the current line-of-sight coordinates of the client 22 are not included in the region of the counselor moving image bitmap 125 in which the bit is set to "1", the line-of-sight estimation unit 180 determines that the client 22 is not currently watching the counselor moving image 61.

Furthermore, the line-of-sight estimation unit 180 calculates a current interest level of the client 22. The current interest level is, for example, a ratio [%] of the number of times when it is determined that the client 22 watches the counselor moving image 61 from a fixed time before the current time (for example, 10 seconds before) to the current time.

The estimation result display unit 190 displays a result of the line-of-sight estimation. For example, in a case where the current interest level of the client 22 is larger than a threshold, the estimation result display unit 190 displays a message indicating that the client 22 is interested in the topic on the monitor 31.

Note that, lines connecting the respective elements illustrated in FIG. 6 indicate a part of communication paths, and a communication path other than the illustrated communication path may also be set. Furthermore, the function of each element illustrated in FIG. 6 can be realized, for example, by allowing the computer to execute a program module corresponding to the element.

Next, a method for generating data stored in the storage unit 120 will be described. First, a method for generating the material region bitmap 123 and the moving image and camera region bitmap 124 will be described.

Figure 7:
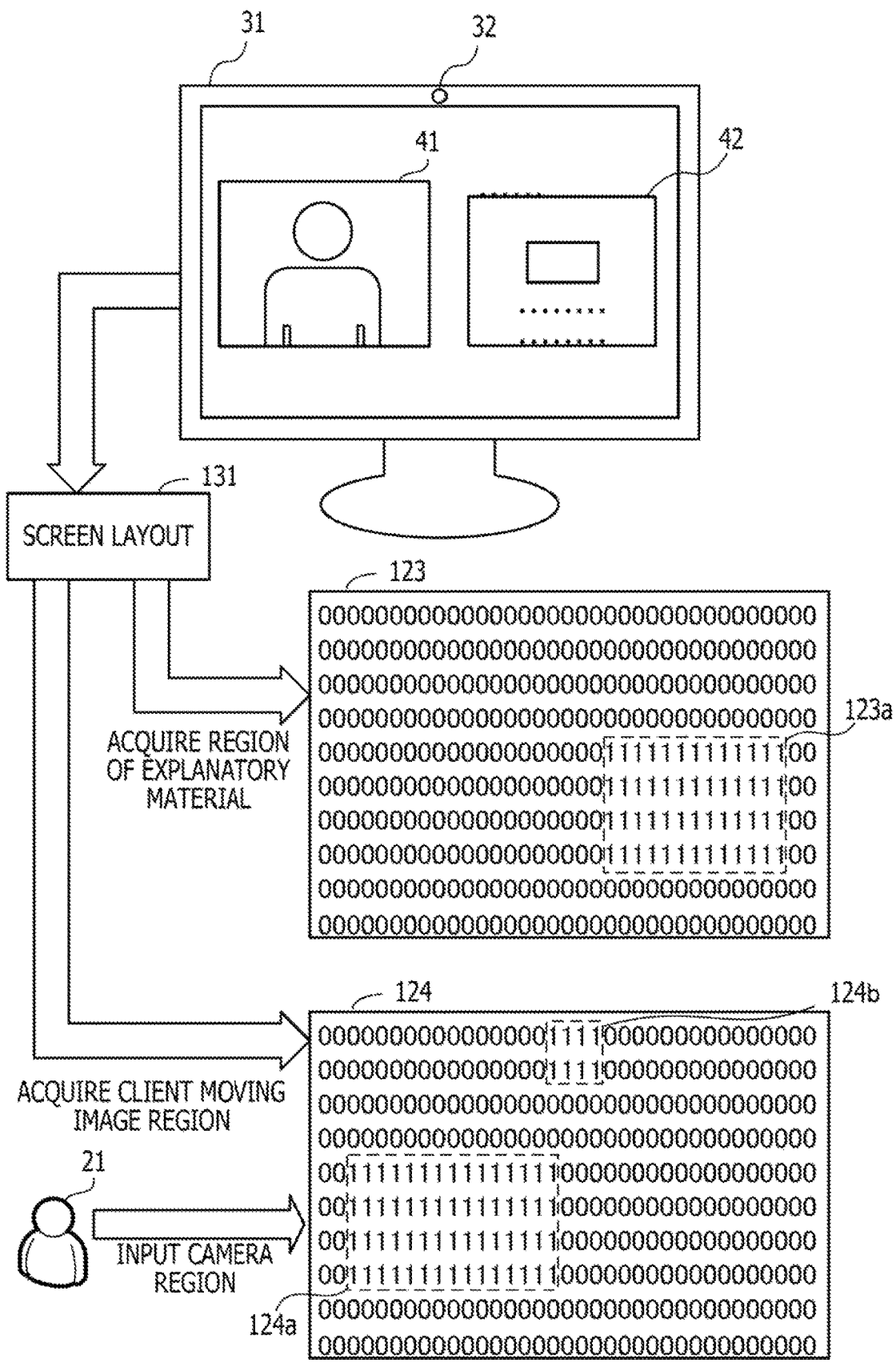
FIG. 7 is a diagram illustrating an example of a method for generating a material region bitmap and a moving image and camera region bitmap.

FIG. 7 is a diagram illustrating an example of the method for generating the material region bitmap and the moving image and camera region bitmap. The layout acquisition unit 130 generates the material region bitmap 123 and the moving image and camera region bitmap 124 on the basis of a screen layout 131 of the monitor 31. The screen layout 131 indicates a display region of the client moving image 41 and a display region of the explanatory material 42 in the screen of the monitor 31, for example.

The layout acquisition unit 130 generates the material region bitmap 123 and the moving image and camera region bitmap 124 from an initial bitmap having bits respectively corresponding to the plurality of unit regions obtained by dividing the screen of the monitor 31. Note that an initial value of each bit of the initial bitmap is "0".

When the material region bitmap 123 is generated, the layout acquisition unit 130 acquires a material region 123a where the explanatory material 42 is displayed from the screen layout 131 of the monitor 31. The layout acquisition unit 130 sets a bitmap, in which a bit corresponding to a unit region included in the material region 123a is set to "1" in the initial bitmap, as the material region bitmap 123.

When the moving image and camera region bitmap 124 is generated, the layout acquisition unit 130 acquires a moving image region 124a where the client moving image 41 is displayed from the screen layout 131 of the monitor 31. Furthermore, the layout acquisition unit 130 acquires a camera region 124b where the camera 32 is provided on the screen of the monitor 31 from the input of the counselor 21. The layout acquisition unit 130 sets a bitmap in which the bit corresponding to the unit region included in the moving image region 124a or the camera region 124b is set to "1" in the initial bitmap as the moving image and camera region bitmap 124.

By comparing the line-of-sight coordinates of the counselor 21 acquired in the unit period with each of the material region bitmap 123 and the moving image and camera region bitmap 124, the period determination unit 171 determines the material explanation period and the free conversation period. When the material explanation period and the free conversation period are determined, the position estimation unit 172 estimates the display region of the counselor moving image 61 on the monitor 51 of the client terminal 200 and generates the counselor moving image bitmap 125 indicating the estimated region.

Figure 8:
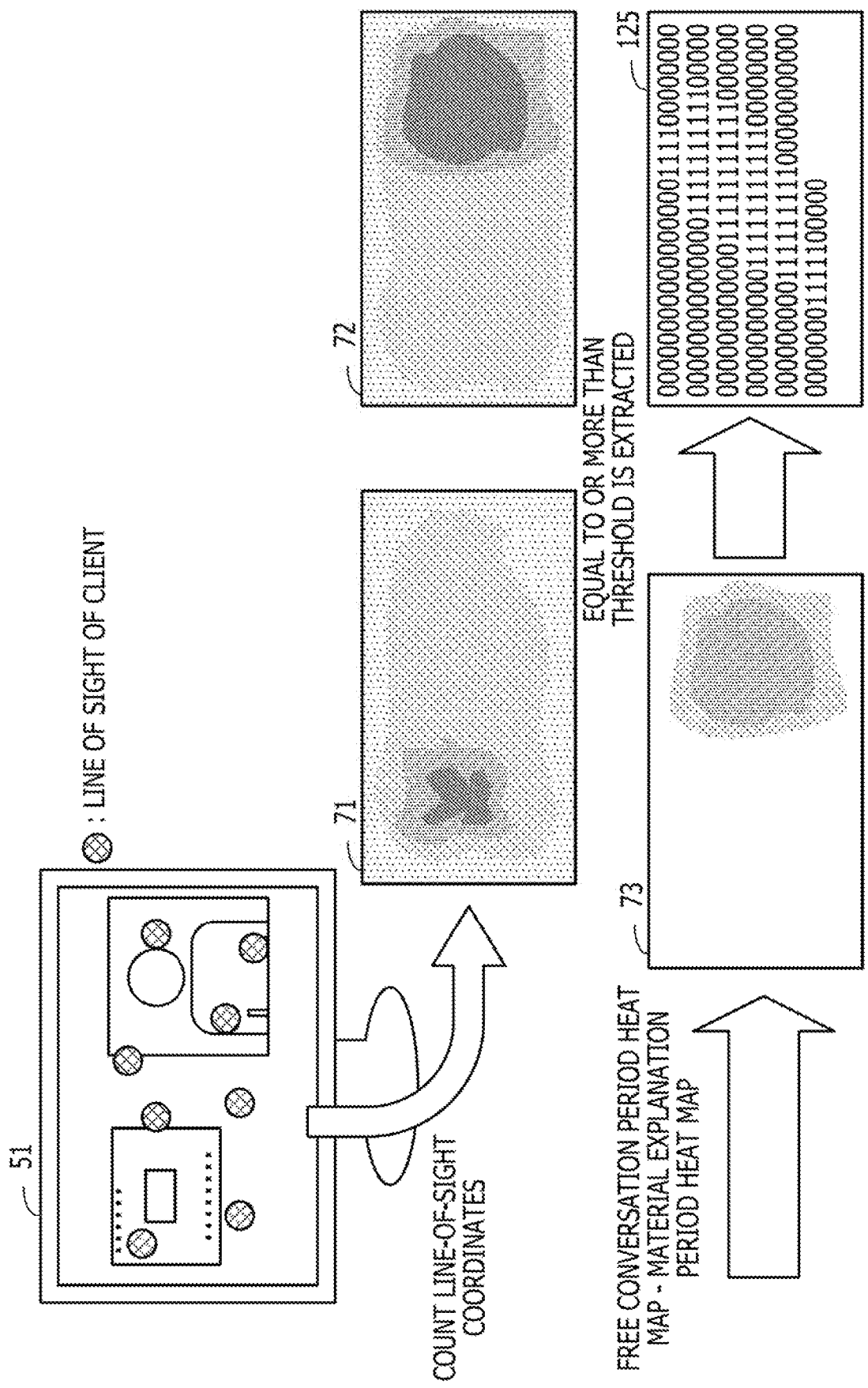
FIG. 8 is a diagram illustrating an example of a method for generating a counselor moving image bitmap.

FIG. 8 is a diagram illustrating an example of a method for generating a counselor moving image bitmap. The position estimation unit 172 generates the counselor moving image bitmap 125 on the basis of a difference between a total of the line-of-sight coordinates of the client 22 in the material explanation period and a total of the line-of-sight coordinates of the client 22 in the free conversation period.

The position estimation unit 172 counts the line-of-sight coordinates of the client 22 by using an initial array including elements respectively corresponding to the plurality of unit regions obtained by dividing the screen of the monitor 51. An initial value of each element in the initial array is, for example, "0". The position estimation unit 172 updates the value of the initial array and generates a material explanation period heat map 71 indicating the total of the line-of-sight coordinates of the client 22 in the material explanation period and a free conversation period heat map 72 indicating the total of the line-of-sight coordinates of the client 22 in the free conversation period. Note that, in FIG. 8, a magnitude of the value of each element in the heat map is expressed by shading of dots.

When the material explanation period heat map 71 is generated, the position estimation unit 172 updates each element in the initial array to the number of line-of-sight coordinates of the client 22 in the material explanation period included in the corresponding unit region. Then, the position estimation unit 172 sets the material explanation period heat map 71 obtained by dividing each updated element of the initial array by the number of line-of-sight coordinates of the client 22 in the material explanation period.

When the free conversation period heat map 72 is generated, the position estimation unit 172 updates each element in the initial array to the number of line-of-sight coordinates of the client 22 in the free conversation period included in the corresponding unit region. Then, the position estimation unit 172 obtains the free conversation period heat map 72 by dividing each updated element of the initial array by the number of line-of-sight coordinates of the client 22 in the free conversation period. Note that the line-of-sight coordinates of the client 22 at the time when it is determined that the orientation of the face of the client 22 is largely deviated from the average are not included in the line-of-sight coordinates of the client 22 in the free conversation period in the generation of the free conversation period heat map 72.

The position estimation unit 172 generates a difference heat map 73 indicating a difference between the free conversation period heat map 72 and the material explanation period heat map 71. Each element of the difference heat map 73 stores a value obtained by subtracting a value of the corresponding element of the material explanation period heat map 71 from the value of the corresponding element of the free conversation period heat map 72. Then, the position estimation unit 172 generates the counselor moving image bitmap 125 from the difference heat map 73. The counselor moving image bitmap 125 has a bit corresponding to each element of the difference heat map 73. The counselor moving image bitmap 125 is a bitmap in which a bit, in the difference heat map 73, corresponding to an element of which a value is equal to or more than a threshold is set to "1" and other bits are set to "0".

Note that the counselor moving image bitmap 125 is generated on the basis of the line-of-sight coordinates of the client 22 in a fixed time (for example, 15 minutes). Therefore, after the fixed time (for example, after 15 minutes) from the start of counseling, the counselor moving image bitmap 125 is generated, and the line-of-sight estimation is started.

Next, information held by the counselor terminal 100 will be described in detail with reference to FIG. 9.

FIG. 9 is a diagram illustrating an example of the line-of-sight estimation result table. In the line-of-sight estimation result table 126, the line-of-sight estimation result and the interest level are set in association with time. The time is indicated, for example, by a time from the start of the line-of-sight estimation.

In the line-of-sight estimation result, a result of the line-of-sight estimation at a corresponding time is set. For example, in a case where the client 22 watches the counselor moving image 61 at the corresponding time, the line-of-sight estimation result is set to "1", and in a case the client 22 does not watch the counselor moving image 61 at the corresponding time, the line-of-sight estimation result is set to "0". In the interest level, an interest level of the client 22 at the corresponding time is set. Here, the interest level at a certain time is calculated on the basis of the line-of-sight estimation result from a fixed time before the time (for example, 10 seconds before) to the time. Therefore, the interest level corresponding to a time after the fixed time (for example, after 10 seconds) from the start of the line-of-sight estimation is blank.

Hereinafter, a procedure for estimating a counselor moving image position will be described in detail.

Figure 10:
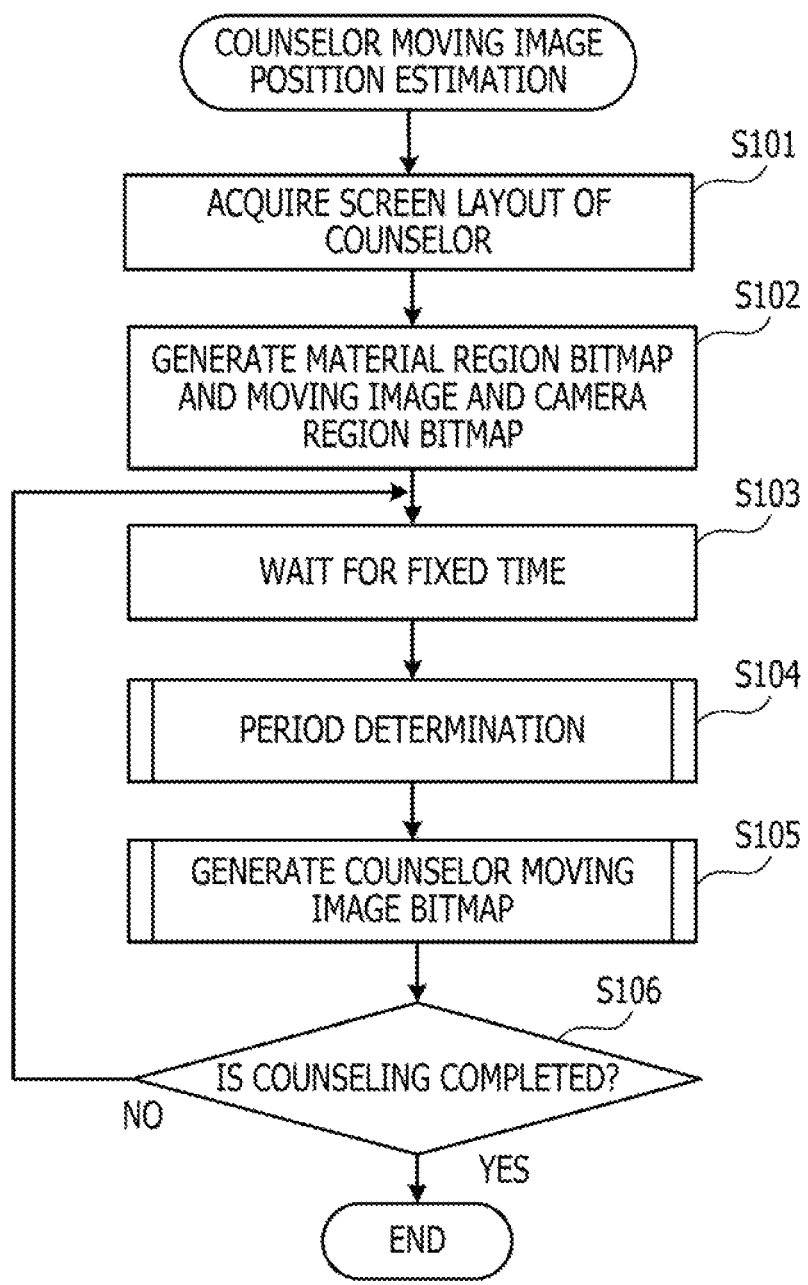
FIG. 10 is a flowchart illustrating an example of a procedure for estimating a counselor moving image position.

FIG. 10 is a flowchart illustrating an example of the procedure for estimating the counselor moving image position. Hereinafter, processing illustrated in FIG. 10 will be described along step numbers.

[Step S101] The layout acquisition unit 130 acquires the screen layout 131 indicating a configuration of the screen displayed on the monitor 31 of the counselor terminal 100. The screen layout 131 may be acquired from the OS of the counselor terminal 100 or may be input by the counselor 21. Furthermore, the layout acquisition unit 130 acquires a region on the screen of the monitor 31 where the camera 32 is provided. The region where the camera 32 is provided is specified, for example, according to the input of the counselor 21.

[Step S102] The layout acquisition unit 130 generates the material region bitmap 123 and the moving image and camera region bitmap 124 on the basis of the screen layout 131 acquired in step S101 and the region where the camera 32 is provided. The layout acquisition unit 130 stores the generated material region bitmap 123 and moving image and camera region bitmap 124 in the storage unit 120.

[Step S103] The counselor moving image position estimation unit 170 waits for a fixed time (for example, for 15 minutes). After the fixed time has elapsed, the counselor moving image position estimation unit 170 proceeds the processing to step S104.

[Step S104] The period determination unit 171 estimates the material explanation period and the free conversation period by using the counselor images 121-1, 121-2, 121-3 . . . , the material region bitmap 123, and the moving image and camera region bitmap 124. Details of period determination will be described later (refer to FIG. 11).

[Step S105] The position estimation unit 172 generates the counselor moving image bitmap 125 by using the client images 122-1, 122-2, 122-3 . . . . Details of counselor moving image bitmap generation will be described later (refer to FIG. 12).

[Step S106] The counselor moving image position estimation unit 170 determines whether or not the counseling is completed. For example, in a case where communication between the counselor terminal 100 and the client terminal 200 is terminated, the counselor moving image position estimation unit 170 determines that the counseling is completed. In a case of determining that the counseling is completed, the counselor moving image position estimation unit 170 terminates the processing. Furthermore, in a case of determining that the counseling is not completed, the counselor moving image position estimation unit 170 proceeds the processing to step S103.

In this way, the counselor moving image bitmap 125 indicating the estimated position of the counselor moving image 61 on the monitor 51 is generated. The first counselor moving image bitmap 125 is generated on the basis of the counselor images 121-1, 121-2, 121-3 . . . and the client images 122-1, 122-2, 122-3 . . . acquired in the fixed time from the start of the counseling.

Thereafter, the counselor moving image bitmap 125 is updated for each fixed time. At this time, the elapse of the fixed time increases the number of counselor images 121-1, 121-2, 121-3 . . . and the number of client images 122-1, 122-2, 122-3 . . . stored in the storage unit 120. Then, the number of counselor images 121-1, 121-2, 121-3 . . . and the client images 122-1, 122-2, 122-3 . . . used to generate the counselor moving image bitmap 125 also increase. Therefore, the accuracy for estimating the position of the counselor moving image 61 indicated by the counselor moving image bitmap 125 is improved for each fixed time.

Next, the period determination will be described in detail.

Figure 11:
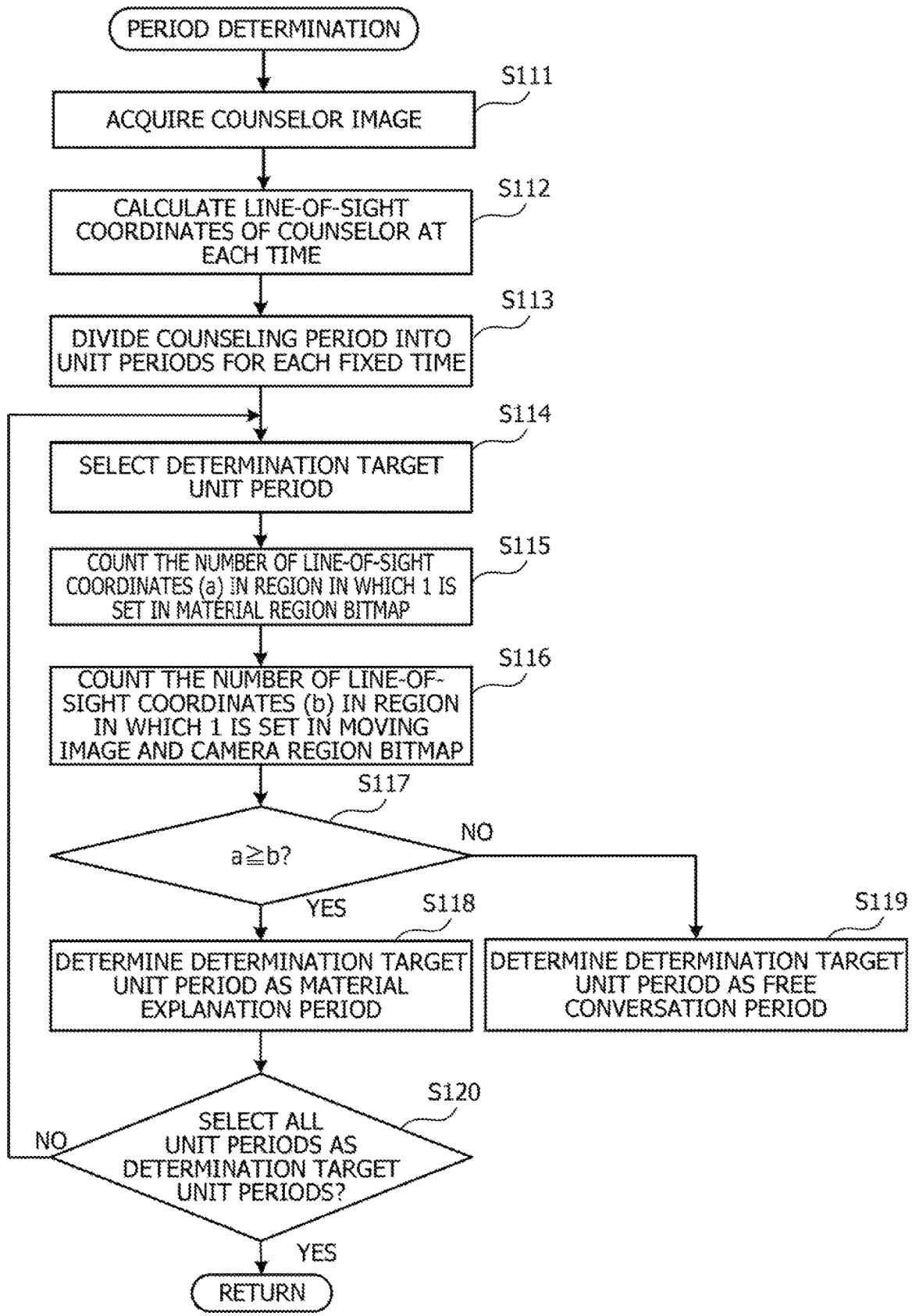
FIG. 11 is a flowchart illustrating an example of a procedure of period determination.

FIG. 11 is a flowchart illustrating an example of a procedure of the period determination. Hereinafter, processing illustrated in FIG. 11 will be described along step numbers.

[Step S111] The period determination unit 171 acquires the counselor images 121-1, 121-2, 121-3 . . . from the storage unit 120.

[Step S112] The period determination unit 171 makes the line-of-sight coordinate calculation unit 150 calculate the line-of-sight coordinates of the counselor 21 from the counselor images 121-1, 121-2, 121-3 . . . . The line-of-sight coordinate calculation unit 150 calculates the line-of-sight coordinates of the counselor 21 at each time when each of the counselor images 121-1, 121-2, 121-3 . . . is imaged.

[Step S113] The period determination unit 171 divides the period (counseling period) from the start of the counseling to the current time into unit periods for each fixed time (for example, five minutes).

[Step S114] The period determination unit 171 selects one determination target unit period from all the unit periods.

[Step S115] The period determination unit 171 counts the number of line-of-sight coordinates in the region corresponding to the bit that is set to be "1" in the material region bitmap 123 among the line-of-sight coordinates of the counselor 21 at the respective times in the determination target unit period selected in step S114. The period determination unit 171 substitutes the counted value into a variable a.

[Step S116] The period determination unit 171 counts the number of line-of-sight coordinates in the region corresponding to the bit that is set to be "1" in the moving image and camera region bitmap 124 among the line-of-sight coordinates of the counselor 21 at the respective times in the determination target unit period selected in step S114. The period determination unit 171 substitutes the counted value into a variable b.

[Step S117] The period determination unit 171 determines whether or not the variable a is equal to or more than the variable b. For example, the period determination unit 171 determines whether or not the number of line-of-sight coordinates in the region corresponding to the bit that is set to "1" in the material region bitmap 123 among the line-of-sight coordinates in the determination target unit period is equal to or more than that in the moving image and camera region bitmap 124. In a case of determining that the variable a is equal to or more than the variable b, the period determination unit 171 proceeds the processing to step S118. Furthermore, in a case of determining that the variable a is less than the variable b, the period determination unit 171 proceeds the processing to step S119.

[Step S118] The period determination unit 171 determines that the determination target unit period selected in step S114 is the material explanation period. Then, the period determination unit 171 proceeds the processing to step S120.

[Step S119] The period determination unit 171 determines that the determination target unit period selected in step S114 is the free conversation period.

[Step S120] The period determination unit 171 determines whether or not all the unit periods are selected as the determination target unit periods. In a case of determining that all the unit periods are selected as the determination target unit periods, the period determination unit 171 terminates the processing. Furthermore, in a case of determining that the unit period that is not selected as the determination target unit period remains, the period determination unit 171 proceeds the processing to step S114.

In this way, each unit period included in the period from the start of the counseling to the current time is set as the determination target unit period, and it is estimated whether each determination target unit period is the material explanation period or the free conversation period. Here, in a case where the number of line-of-sight coordinates included in the display region of the explanatory material 42 among the line-of-sight coordinates of the counselor 21 in the determination target unit period is equal to or more than the number of line-of-sight coordinates included in the display region of the client moving image 41 or the region where the camera 32 is provided, it is estimated that the determination target unit period is the material explanation period. For example, in a case where the ratio of the line of sight directed to the display region of the client moving image 41 or the region where the camera 32 is provided among the line of sight of the counselor 21 in the determination target unit period is less than a predetermined value, it is determined that the determination target unit period is the free conversation period. With this determination, it is possible to determine the period on the basis of the tendency of the line of sight of the counselor 21 which is different depending on whether the period is the material explanation period or the free conversation period.

Next, generation of the counselor moving image bitmap will be described in detail.

Figure 12:
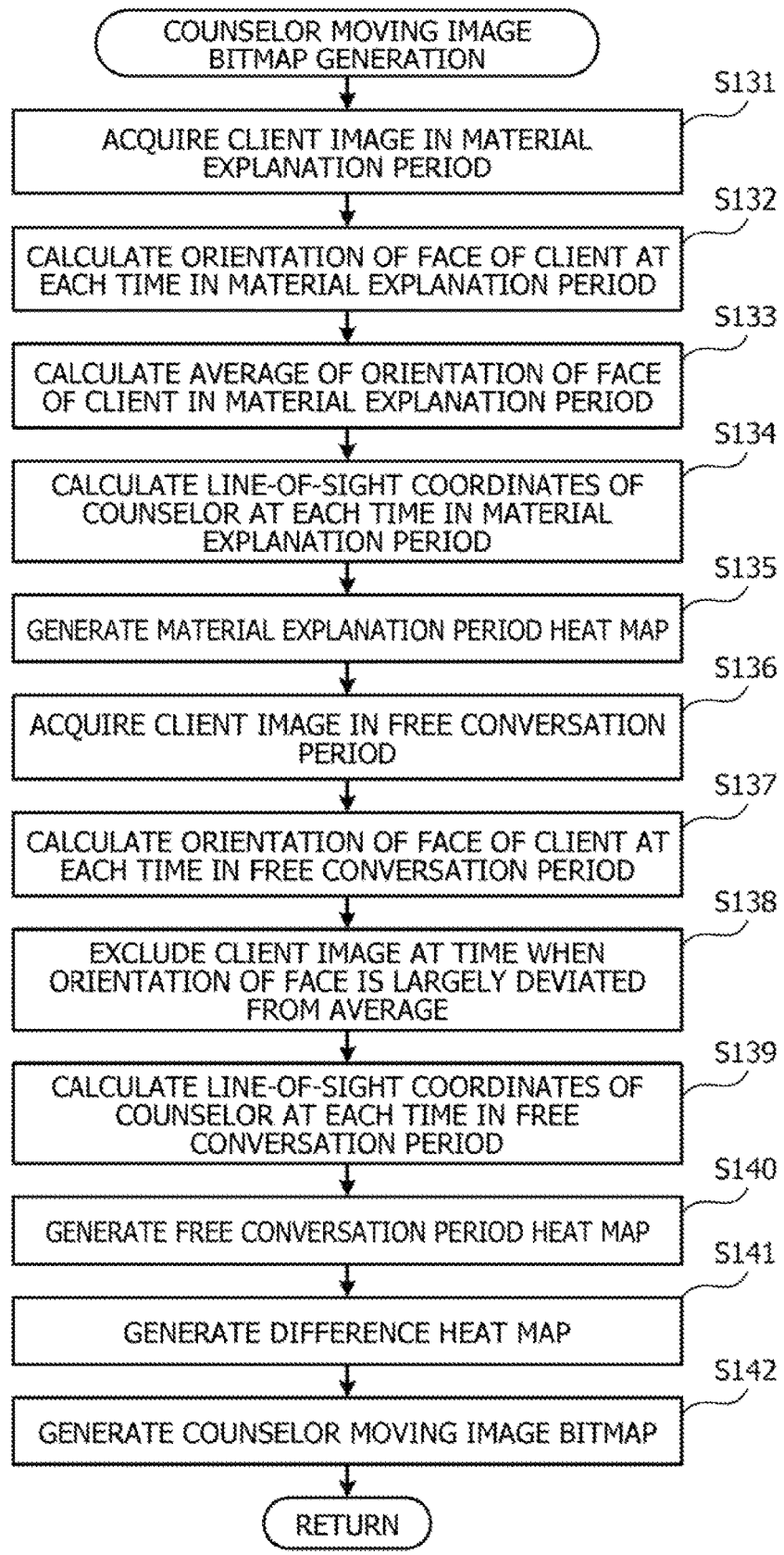
FIG. 12 is a flowchart illustrating an example of a procedure for generating the counselor moving image bitmap.

FIG. 12 is a flowchart illustrating an example of a procedure for generating the counselor moving image bitmap. Hereinafter, processing illustrated in FIG. 12 will be described along step numbers.

[Step S131] The position estimation unit 172 acquires the client image, imaged in the material explanation period, among the client images 122-1, 122-2, 122-3 . . . from the storage unit 120.

[Step S132] The position estimation unit 172 makes the face orientation calculation unit 160 calculate the value indicating the orientation of the face of the client 22 from the client image acquired in step S131. The face orientation calculation unit 160 calculates a value indicating the orientation of the face of the client 22 at each time in the material explanation period. The value indicating the orientation of the face of the client 22 is, for example, a ratio of the size of the left eye to the size of the right eye of the client 22 imaged in the client image.

[Step S133] The position estimation unit 172 calculates an average value of the values indicating the orientation of the face of the client 22 in the material explanation period.

[Step S134] The position estimation unit 172 makes the line-of-sight coordinate calculation unit 150 calculate the line-of-sight coordinates of the client 22 from the client image acquired in step S131. The line-of-sight coordinate calculation unit 150 calculates the line-of-sight coordinates of the client 22 at each time in the material explanation period.

[Step S135] The position estimation unit 172 generates the material explanation period heat map 71. For example, the position estimation unit 172 stores the number of line-of-sight coordinates included in the corresponding unit region among the line-of-sight coordinates of the client 22 calculated in step S134 in each element of the initial array including the elements respectively corresponding to the plurality of unit regions obtained by dividing the screen of the monitor 51. Then, the position estimation unit 172 sets an array obtained by dividing each element of the initial array that stores the number of line-of-sight coordinates by the number of line-of-sight coordinates of the client 22 calculated in step S134 as the material explanation period heat map 71.

[Step S136] The position estimation unit 172 acquires the client image, imaged in the free conversation period, among the client images 122-1, 122-2, 122-3 . . . from the storage unit 120.

[Step S137] The position estimation unit 172 makes the face orientation calculation unit 160 calculate the value indicating the orientation of the face of the client 22 from the client image acquired in step S131. The face orientation calculation unit 160 calculates a value indicating the orientation of the face of the client 22 at each time in the free conversation period.

[Step S138] The position estimation unit 172 calculates a difference between the value indicating the orientation of the face calculated in step S137 at each time in the free conversation period and the average value calculated in step S133. Then, the position estimation unit 172 excludes the client image at a time when an absolute value of the calculated difference is equal to or more than a threshold (for example, time when orientation of face is largely deviated from average) from the client image acquired in step S136.

[Step S139] The position estimation unit 172 makes the line-of-sight coordinate calculation unit 150 calculate the line-of-sight coordinates of the client 22 from the client image that is not excluded in step S138 from the client image acquired in step S136. The line-of-sight coordinate calculation unit 150 calculates the line-of-sight coordinates of the client 22 at each time in the free conversation period.

[Step S140] The position estimation unit 172 generates the free conversation period heat map 72. For example, the position estimation unit 172 stores the line-of-sight coordinates included in the corresponding unit region among the line-of-sight coordinates of the client 22 calculated in step S139 in each element of the initial array including the elements respectively corresponding to the plurality of unit regions obtained by dividing the screen of the monitor 51. Then, the position estimation unit 172 sets an array obtained by dividing each element of the initial array that stores the number of line-of-sight coordinates by the number of line-of-sight coordinates of the client 22 calculated in step S139 as the free conversation period heat map 72.

[Step S141] The position estimation unit 172 generates the difference heat map 73. For example, the position estimation unit 172 sets the heat map obtained by subtracting the value of the corresponding element of the material explanation period heat map 71 from the value of each element of the free conversation period heat map 72 as the difference heat map 73.

[Step S142] The position estimation unit 172 generates the counselor moving image bitmap 125 from the difference heat map 73. For example, the position estimation unit 172 generates a bitmap having a bit, of which an initial value is "0", corresponding to each element of the difference heat map 73. Then, the position estimation unit 172 extracts an element, of which a value is equal to or more than a threshold, from among the elements in the difference heat map 73 and sets the generated bitmap in which the bit corresponding to the extracted bit among the bits in the generated bitmap is set to "1" as the counselor moving image bitmap 125.

In this way, the counselor moving image bitmap 125 is generated on the basis of the line-of-sight coordinates of the client 22 in the material explanation period and the free conversation period. Here, the line-of-sight coordinates at the time when the orientation of the face of the client 22 is largely deviated from the average are not used to generate the counselor moving image bitmap 125. With this operation, the line-of-sight coordinates in a case where the client 22 looks away are removed.

There is a case where the line of sight of the client 22 is directed in the material explanation period to the position, to which the line of sight is directed in a case where the client 22 looks away, at low frequency. Therefore, when the line-of-sight coordinates in a case where the client 22 looks away are counted in the material explanation period heat map 71, there is a possibility that the value of the element corresponding to the region including the line-of-sight coordinates in the difference heat map 73 is larger than a threshold. Then, in the region to which the line of sight is directed when the client 22 looks away, the counselor moving image 61 is wrongly detected. Therefore, by removing the line-of-sight coordinates in a case where the client 22 looks away, accuracy of the counselor moving image bitmap 125 is improved.

Figure 13:
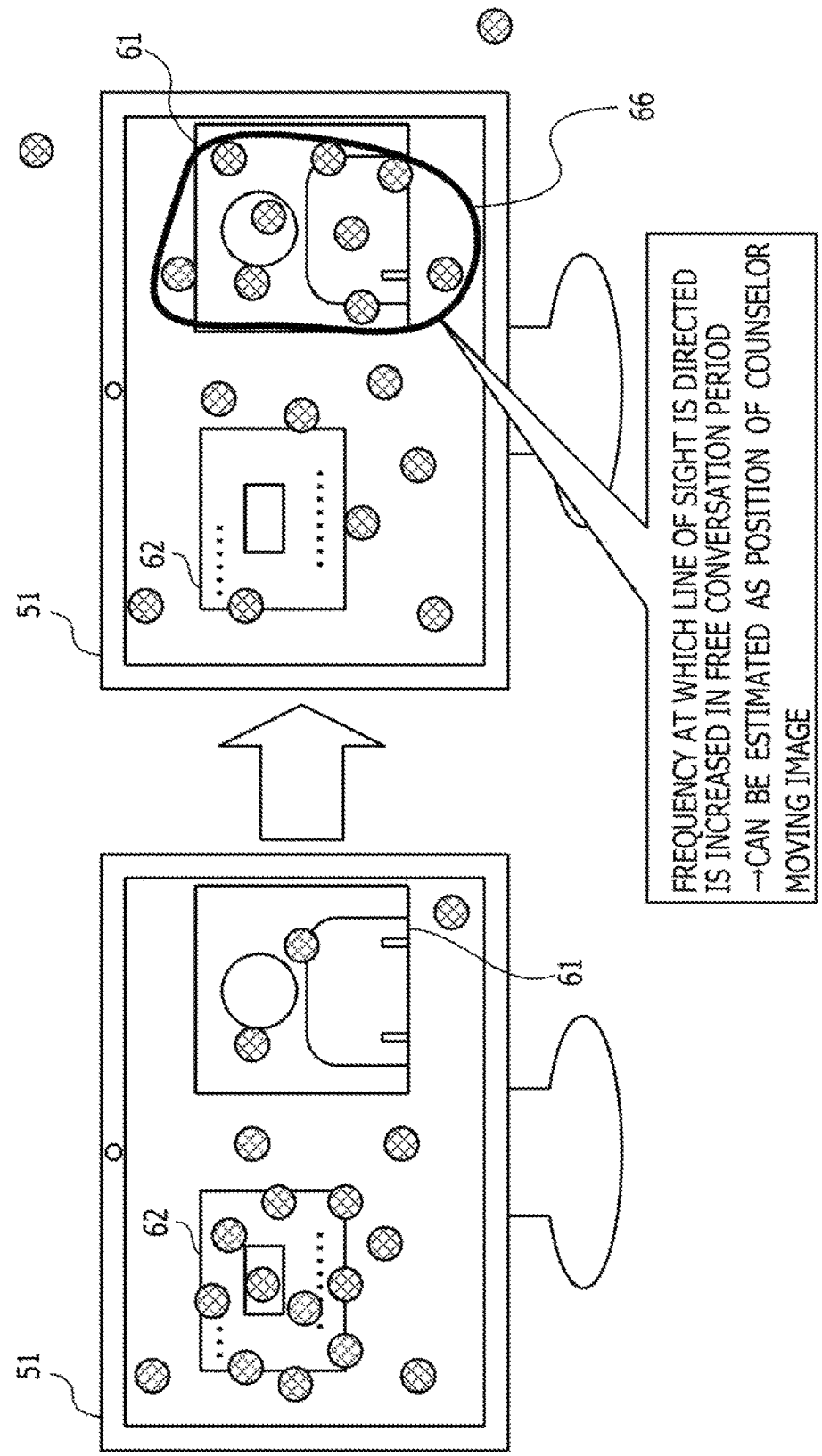
FIG. 13 is a diagram illustrating an example of an estimated position of the counselor moving image on the monitor.

FIG. 13 is a diagram illustrating an example of an estimated position of the counselor moving image on the monitor. The monitor 51 displays the counselor moving image 61 and the explanatory material 62. Furthermore, a mark illustrated in FIG. 13 indicates an example of the line of sight of the client 22 to the monitor 51.

The line of sight of the client 22 is frequently directed to a region around the explanatory material 62 in the material explanation period. Furthermore, in the material explanation period, there is a case where the line of sight of the client 22 is directed to a region around the counselor moving image 61 and a region where both of the counselor moving image 61 and the explanatory material 62 are not displayed.

In the free conversation period, the line of sight of the client 22 is frequently directed to the region around the counselor moving image 61. Furthermore, in the free conversation period, there is a case where the line of sight of the client 22 is directed to the region around the explanatory material 62, the region where both of the counselor moving image 61 and the explanatory material 62 are not displayed, and a region other than the monitor 51.

Here, it is estimated that the counselor moving image 61 is in a region corresponding to an element in which the value of the difference heat map 73 that is a difference between the material explanation period heat map 71 in which the line-of-sight coordinates in the material explanation period are counted and the free conversation period heat map 72 in which the line-of-sight coordinates in the free conversation period are counted is equal to or more than a threshold. For example, a region where a frequency at which the line of sight of the client 22 is directed to the region increases in the free conversation period by a certain amount is an estimated counselor moving image region 66. The estimated counselor moving image region 66 is a region estimated to include the counselor moving image 61 and a set of the regions corresponding to the bit "1" in the counselor moving image bitmap 125.

Since the frequency at which the line of sight of the client 22 is directed to the region around the counselor moving image 61 increases in the free conversation period, the region around the counselor moving image 61 is estimated as the estimated counselor moving image region 66. Furthermore, since the frequency at which the line of sight of the client 22 is directed to the region around the explanatory material 62 decreases in the free conversation period, the region around the explanatory material 62 is not estimated as the estimated counselor moving image region 66. Furthermore, since the line of sight of the client 22 is directed to the region where both of the counselor moving image 61 and the explanatory material 62 are not displayed at the same frequency in each of the material explanation period and the free conversation period, the region where both of the counselor moving image 61 and the explanatory material 62 are not displayed is not estimated as the estimated counselor moving image region 66. Furthermore, even if the client 22 looks away, the line of sight directed to the region other than the monitor 51 is removed from the total. Therefore, the region other than the monitor 51 is not estimated as the estimated counselor moving image region 66.

In this way, by estimating the region in which the frequency at which the line of sight of the client 22 is directed to the region increases in the free conversation period as the estimated counselor moving image region 66, the position of the counselor moving image 61 is estimated without the screen layout of the monitor 51.

Next, the line-of-sight estimation will be described in detail.

Figure 14:
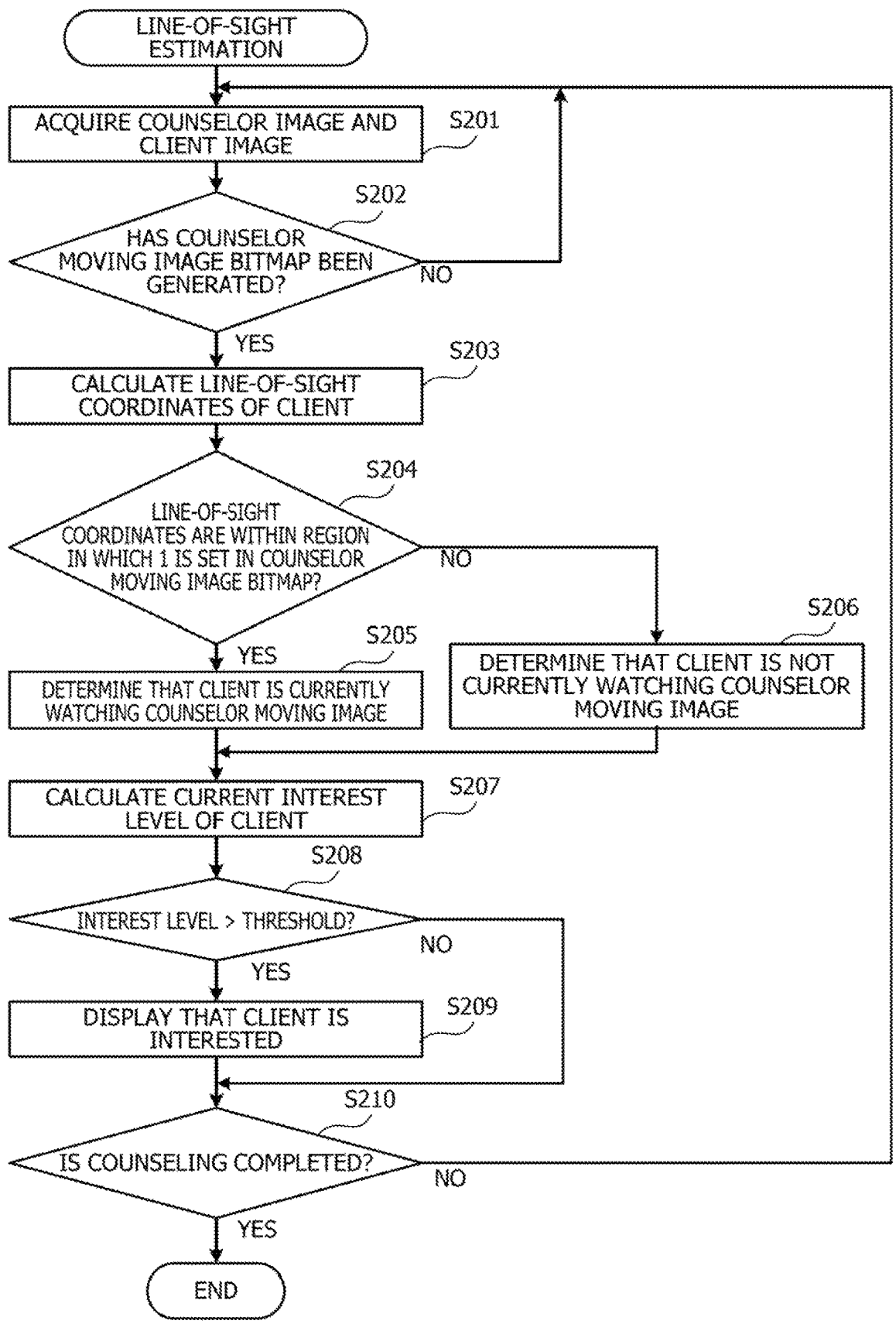
FIG. 14 is a flowchart illustrating an example of a procedure of line-of-sight estimation.

FIG. 14 is a flowchart illustrating an example of a procedure of the line-of-sight estimation. Hereinafter, processing illustrated in FIG. 14 will be described along step numbers.

[Step S201] The image acquisition unit 140 acquires a counselor image and a client image. The image acquisition unit 140 acquires, for example, the current face of the counselor 21 imaged by the camera 32 as the counselor image. Then, the image acquisition unit 140 associates the acquired counselor image with the current time and stores the counselor images as the counselor images 121-1, 121-2, 121-3 . . . . In the storage unit 120. Furthermore, the image acquisition unit 140 acquires the image in which the current face of the client 22 is imaged as the client image, for example, from the moving image received from the client terminal 200. Then, the image acquisition unit 140 associates the acquired client image with the current time and stores the client image as the client images 122-1, 122-2, 122-3 . . . in the storage unit 120. Note that the image acquisition unit 140 executes step S201 at fixed time intervals (for example, 0.5 second intervals).

[Step S202] The image acquisition unit 140 determines whether or not the counselor moving image bitmap 125 has been generated. In a case of determining that the counselor moving image bitmap 125 has been generated, the image acquisition unit 140 proceeds the processing to step S203. Furthermore, in a case of determining that the counselor moving image bitmap 125 has not been generated yet, the image acquisition unit 140 proceeds the processing to step S201.

[Step S203] The line-of-sight coordinate calculation unit 150 calculates the line-of-sight coordinates of the client 22 at a time when the image is captured from the client image acquired in step S201.

[Step S204] The line-of-sight estimation unit 180 determines whether or not the line-of-sight coordinates of the client 22 calculated in step S203 is within a region corresponding to a bit "1" in the counselor moving image bitmap 125. In a case of determining that the line-of-sight coordinates are within the region corresponding to the bit "1" in the counselor moving image bitmap 125, the line-of-sight estimation unit 180 proceeds the processing to step S205. Furthermore, in a case of determining that the line-of-sight coordinates are not within the region corresponding to the bit "1" in the counselor moving image bitmap 125, the line-of-sight estimation unit 180 proceeds the processing to step S206.

[Step S205] The line-of-sight estimation unit 180 determines that the client 22 is currently watching the counselor moving image 61. The line-of-sight estimation unit 180 adds a record in which a time is set to the current time and the line-of-sight estimation result is set to "1" in the line-of-sight estimation result table 126. Then, the line-of-sight estimation unit 180 proceeds the processing to step S207.

[Step S206] The line-of-sight estimation unit 180 determines that the client 22 is not currently watching the counselor moving image 61. The line-of-sight estimation unit 180 adds a record in which a time is set to the current time and the line-of-sight estimation result is set to "0" in the line-of-sight estimation result table 126.

[Step S207] The line-of-sight estimation unit 180 calculates the current interest level of the client 22. For example, the line-of-sight estimation unit 180 refers to the line-of-sight estimation result table 126 and calculates a ratio [%] of fields that are set to "1" among fields of line-of-sight estimation results from 10 seconds before the current time to the current time as the current interest level of the client 22. Then, the line-of-sight estimation unit 180 sets the calculated interest level as an interest level corresponding to the current time of the line-of-sight estimation result table 126.

[Step S208] The estimation result display unit 190 determines whether or not the current interest level of the client 22 calculated in step S207 is equal to or more than a threshold. In a case of determining that the interest level is larger than the threshold, the estimation result display unit 190 proceeds the processing to step S209. Furthermore, in a case of determining that the interest level is equal to or less than the threshold, the estimation result display unit 190 proceeds the processing to step S210.

[Step S209] The estimation result display unit 190 displays that the client 22 is interested on the monitor 31.

[Step S210] The line-of-sight estimation unit 180 determines whether or not the counseling is completed. For example, in a case where communication between the counselor terminal 100 and the client terminal 200 is terminated, the line-of-sight estimation unit 180 determines that the counseling is completed. In a case of determining that the counseling is completed, the line-of-sight estimation unit 180 terminates the processing. Furthermore, in a case of determining that the counseling is not completed, the line-of-sight estimation unit 180 proceeds the processing to step S201.

In this way, it is estimated whether or not the client 22 is currently watching the counselor moving image 61 from the counselor moving image bitmap 125 and the current image of the client 22. With this operation, it is estimated whether or not the client 22 is currently watching the counselor moving image 61 without the screen layout of the monitor 51.

Furthermore, the current interest level of the client 22 is calculated on the basis of the line-of-sight estimation result. The interest level indicates a frequency at which the client 22 looks at the counselor 21. For example, in a case where the interest level suddenly increases, the client 22 wants to speak in many cases. Furthermore, for example, in a case where the interest level is low, the client 22 has low interest in the topic of the counselor 21 in many cases. In this way, by calculating the interest level, a psychological state of the client 22 can be estimated in the remote counseling. Hereinafter, a display for notifying the counselor 21 of the interest level will be described.

FIG. 15 is a diagram illustrating a display example of the line-of-sight estimation result. During the counseling, the monitor 31 displays an estimation result display portion 46 in addition to the client moving image 41 and the explanatory material 42. The estimation result display portion 46 performs display according to the current interest level of the client 22.

If the interest level is equal to or less than a threshold, for example, the estimation result display portion 46 does not display a message. For example, when a state where the estimation result display portion 46 displays nothing is continued, the counselor 21 changes the topic. Furthermore, if the interest level exceeds the threshold, for example, the estimation result display portion 46 displays a message indicating that the client 22 is interested, such as "interested". For example, when the estimation result display portion 46 displays "interested", the counselor 21 makes the client 22 speak. In this way, the counselor 21 can smoothly proceed the counseling by having communication according to the interest level.

Furthermore, after the counseling is completed, the counselor terminal 100 may transmit the line-of-sight estimation result table 126 and the moving image of the counselor 21 and the client 22 during counseling to the instructor terminal 23. The instructor of the counselor 21 can evaluate the counselor 21 from the interest level of the client 22 and the state of the counseling at each time.

Figure 16:
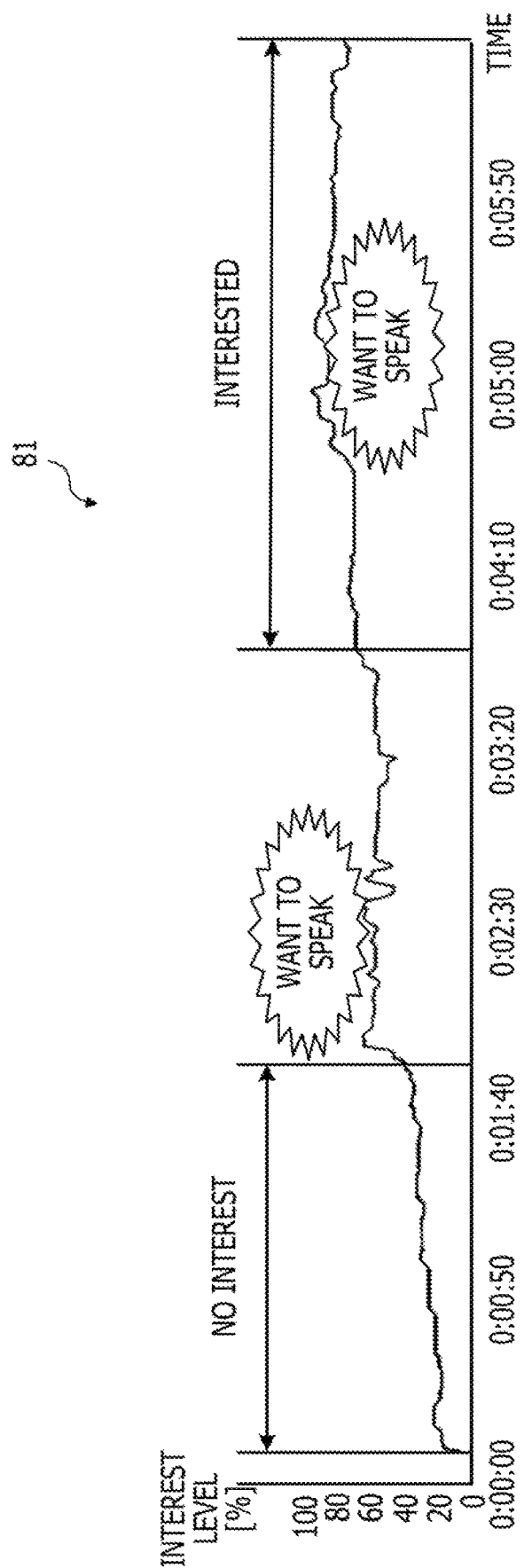
FIG. 16 is a diagram illustrating an example of an interest level graph.

FIG. 16 is a diagram illustrating an example of an interest level graph. An interest level graph 81 is a graph in which the horizontal axis indicates time and the vertical axis indicates the interest level. The interest level graph 81 is generated from the line-of-sight estimation result table 126 and is displayed on the instructor terminal 23.

According to the interest level graph 81, since the interest level is less than 40% in a period from a time about "0:00:10" to a time about "0:02:00", it is estimated that the client 22 is not interested in the topic of the counselor 21. Furthermore, since the interest level is equal to or more than 70% at the time after a time about "0:03:50", it is estimated that the client 22 is interested in the topic of the counselor 21. In this case, in the period from the time about "0:00:10" to the time about "0:02:00" in which the interest level is low, for example, it is preferable for the counselor 21 to change the topic. For example, the instructor of the counselor 21 reproduces a moving image in the time band in which the interest level is low on the instructor terminal 23 and confirms whether or not the counselor 21 has changed the topic in the time band.

Furthermore, according to the interest level graph 81, since an increase in the interest level at each of the time about "0:02:00" and the time about "0:05:00" is large, it is estimated that the client 22 has wanted to speak at the time about "0:02:00" and the time about "0:05:00". In this case, at the time about "0:02:00" and the time about "0:05:00", for example, it is preferable for the counselor 21 to make the client 22 speak. For example, the instructor of the counselor 21 reproduces the moving image in the time band in which the increase in the interest level is large on the instructor terminal 23 and confirms whether or not the counselor 21 make the client 22 speak in the time band.

In this way, the interest level graph 81 presents a time band and matters to be confirmed in order to evaluate the counseling to the instructor of the counselor 21. With this operation, the instructor of the counselor 21 can appropriately evaluate the counseling of the counselor 21.

The embodiments are illustrated as described above. However, the configuration of each portion described in the embodiments may be replaced with another having the similar function. Furthermore, other arbitrary components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

determining a first period in which a first user has described content and a second period in which the first user and a second user perform communication except for the description of the content on the basis of layout information indicating display regions, in a screen of a first display, of a plurality of second user images, in which a face of the second user is imaged, displayed on the first display of a first terminal device in a call performing period of a video call between the first user who uses the first terminal device and the second user who uses a second terminal device connected to the first terminal device via a network and the content displayed on the first display and first line-of-sight information indicating a line of sight of the first user to the first display in the call performing period calculated from a plurality of first user images in which a face of the first user is imaged;

calculating second line-of-sight information indicating a line of sight of the second user in the call performing period based on the plurality of second user images displayed on the first display;

estimating a display region of the plurality of first user images in a screen of a second display in the second display of the second terminal device that displays the content and the plurality of first user images, based on a difference between the line of sight of the second user in the first period and the line of sight of the second user in the second period indicated in the second line-of-sight information; and estimating whether the second user looks at the plurality of first user images displayed on the second display of the second terminal device in the call performing period based on the estimated display region of the plurality of first user images and the second line-of-sight information.

2. The non-transitory computer-readable storage medium according to claim 1, wherein the process comprising:

counting a first number of times indicating the number of times when the line of sight of the second user is directed to a region within the first period for each region obtained by dividing the screen of the second display, counting a second number of times indicating the number of times when the light of sight of the second user is directed to the region within the second period for each region, and estimating a set of the regions in which a value obtained by subtracting the first number of times per time from the second number of times per time is equal to or more than a predetermined value as the display region of the plurality of first user images.

3. The non-transitory computer-readable storage medium according to claim 2, wherein the process comprising:

calculating a value indicating an orientation of the face of the second user in the call performing period from the plurality of second user images and calculating an average value of the value indicating the orientation of the face in the first period, and in the estimation of the display region of the plurality of first user images, when an absolute value of a difference between the value indicating the orientation of the face calculated from a predetermined second user image in which the face of the second user is imaged in the second period and the average value is equal to or more than a threshold, the line of sight of the second user calculated from the predetermined second user image is excluded from a count target.

4. The non-transitory computer-readable storage medium according to claim 1, wherein the process comprising determining the determination target period as the first period, in the determination of the first period and the second period, when a ratio of the line of sight directed to the display region of the content among the line of sight of the first user within a determination target period of a plurality of periods obtained by dividing the call performing period is equal to or more than a predetermined value.

5. The non-transitory computer-readable storage medium according to claim 1, wherein the process comprising determining the determination target period as the first period, in the determination of the first period and the second period, when a ratio of a line of sight directed to the display region of the plurality of second user images or a region where a camera that images the first user is provided among the line of sight of the first user within the determination target period of the plurality of periods obtained by dividing the call performing period is less than a predetermined value.

6. An information processing apparatus, comprising:

a memory; and a processor coupled to the memory and configured to:

determine a first period in which a first user has described content and a second period in which the first user and a second user perform communication except for the description of the content based on layout information indicating display regions, in a screen of a first display, of a plurality of second user images, in which a face of the second user is imaged, displayed on the first display of a first terminal device in a call performing period of a video call between the first user who uses the first terminal device and the second user who uses a second terminal device connected to the first terminal device via a network and the content displayed on the first display and first line-of-sight information indicating a line of sight of the first user to the first display in the call performing period calculated from a plurality of first user images in which a face of the first user is imaged, calculate second line-of-sight information indicating a line of sight of the second user in the call performing period based on the plurality of second user images displayed on the first display, estimate a display region of the plurality of first user images in a screen of a second display in the second display of the second terminal device that displays the content and the plurality of first user images, based on a difference between the line of sight of the second user in the first period and the line of sight of the second user in the second period indicated in the second line-of-sight information, and estimate whether the second user looks at the plurality of first user images displayed on the second display of the second terminal device in the call performing period based on the estimated display region of the plurality of first user images and the second line-of-sight information.

7. A data processing method executed by a computer, the data processing method comprising:

determining a first period in which a first user has described content and a second period in which the first user and a second user perform communication except for the description of the content based on layout information indicating display regions, in a screen of a first display, of a plurality of second user images, in which a face of the second user is imaged, displayed on the first display of a first terminal device in a call performing period of a video call between the first user who uses the first terminal device and the second user who uses a second terminal device connected to the first terminal device via a network and the content displayed on the first display and first line-of-sight information indicating a line of sight of the first user to the first display in the call performing period calculated from a plurality of first user images in which a face of the first user is imaged;

calculating second line-of-sight information indicating a line of sight of the second user in the call performing period based on the plurality of second user images displayed on the first display;

estimating a display region of the plurality of first user images in a screen of a second display in the second display of the second terminal device that displays the content and the plurality of first user images, based on a difference between the line of sight of the second user in the first period and the line of sight of the second user in the second period indicated in the second line-of-sight information; and estimating whether the second user looks at the plurality of first user images displayed on the second display of the second terminal device in the call performing period based on the estimated display region of the plurality of first user images and the second line-of-sight information.

8. The data processing method according to claim 7, wherein the method comprising:

counting a first number of times indicating the number of times when the line of sight of the second user is directed to a region within the first period for each region obtained by dividing the screen of the second display, counting a second number of times indicating the number of times when the light of sight of the second user is directed to the region within the second period for each region, and estimating a set of the regions in which a value obtained by subtracting the first number of times per time from the second number of times per time is equal to or more than a predetermined value as the display region of the plurality of first user images.

9. The data processing method according to claim 8, wherein the method comprising:

calculating a value indicating an orientation of the face of the second user in the call performing period from the plurality of second user images and calculating an average value of the value indicating the orientation of the face in the first period, and in the estimation of the display region of the plurality of first user images, when an absolute value of a difference between the value indicating the orientation of the face calculated from a predetermined second user image in which the face of the second user is imaged in the second period and the average value is equal to or more than a threshold, the line of sight of the second user calculated from the predetermined second user image is excluded from a count target.

10. The data processing method according to claim 7, wherein the method comprising:

determining the determination target period as the first period, in the determination of the first period and the second period, when a ratio of the line of sight directed to the display region of the content among the line of sight of the first user within a determination target period of a plurality of periods obtained by dividing the call performing period is equal to or more than a predetermined value.

11. The data processing method according to claim 7, wherein the method comprising:

determining the determination target period as the first period, in the determination of the first period and the second period, when a ratio of a line of sight directed to the display region of the plurality of second user images or a region where a camera that images the first user is provided among the line of sight of the first user within the determination target period of the plurality of periods obtained by dividing the call performing period is less than a predetermined value.

* * * * *